(12) United States Patent
Yoshimura

(10) Patent No.: US 7,076,052 B2
(45) Date of Patent: Jul. 11, 2006

(54) TELEPHONE TERMINAL

(75) Inventor: Katsuji Yoshimura, Hamakita (JP)

(73) Assignee: Yamaha Corporation, Hamamatsu (JP)

( * ) Notice: Subject to any disclaimer, the term of this patent is extended or adjusted under 35 U.S.C. 154(b) by 427 days.

(21) Appl. No.: 10/204,960

(22) PCT Filed: Mar. 1, 2001

(86) PCT No.: PCT/JP01/01564

§ 371 (c)(1),
(2), (4) Date: Aug. 27, 2002

(87) PCT Pub. No.: WO01/65534

PCT Pub. Date: Sep. 7, 2001

(65) Prior Publication Data

US 2003/0012361 A1    Jan. 16, 2003

(30) Foreign Application Priority Data

Mar. 2, 2000    (JP)    ............................. 2000-056982

(51) Int. Cl.
*H04M 3/02*    (2006.01)
(52) U.S. Cl. .................. 379/373.01; 455/567
(58) Field of Classification Search ................ 455/401, 455/567; 379/372–374; 84/615, 601
See application file for complete search history.

(56) References Cited

U.S. PATENT DOCUMENTS 5,698,804 A * 12/1997 Mizuno ........................ 84/610

FOREIGN PATENT DOCUMENTS

| JP | 08-221063 | * | 8/1996 |
| JP | H08-221063 | | 8/1996 |
| JP | 10-150505 | | 6/1998 |
| JP | H10-150505 | | 6/1998 |
| JP | 2000-056758 | | 2/2000 |
| JP | 2001-209381 | | 8/2001 |

OTHER PUBLICATIONS

Japanese Patent Office, "English translation of the selected pragraph of a Notice of Rejection, which is issued with respect to Japanese Patent Application No. 2000-056982," (Jun. 8, 2004).
Japanese Patent Office, "English translation of the decision of rejection issued on Japanese Patent Application No. 2000-056982 with regard to the Examiner's technical comments.," (Nov. 30, 2004).

* cited by examiner

*Primary Examiner*—Sinh Tran
*Assistant Examiner*—Walter F Briney, III
(74) *Attorney, Agent, or Firm*—Pillsbury Winthrop Shaw Pittman LLP

(57) ABSTRACT

A telephone terminal device such as a portable telephone performs music playback processes with respect to use-specified music data in which tempos, tone colors, and pitches are specifically processed to suit different uses while tone color assignment and musical score are commonly shared among different uses, or common-use music data that are partially modified to suit a specific use in reproduction such as production of incoming call melody sound, hold sound, background music (BGM) during conversation in progress, karaoke accompaniment sound, and music for appreciation.

3 Claims, 10 Drawing Sheets

| TONE COLOR DATA | FOR USES OF INCOMING CALL MELODY, HOLD SOUND |
| | FOR USES OF BGM, KARAOKE ACCOMPANIMENT SOUND, APPRECIATION OF MUSIC |
| TONE COLOR ASSIGNMENT DATA (COMMON) | |
| TEMPO DATA | FOR USES OF INCOMING CALL MELODY, HOLD SOUND |
| | FOR USES OF BGM, KARAOKE ACCOMPANIMENT SOUND, APPRECIATION OF MUSIC |
| PLAYBACK START POSITION DATA | FOR USE OF INCOMING CALL MELODY |
| | FOR USES OF HOLD SOUND, BGM, KARAOKE ACCOMPANIMENT SOUND, APPRECIATION OF MUSIC |
| PITCH SHIFT DATA | FOR USES OF INCOMING CALL MELODY, HOLD SOUND |
| | FOR USES OF BGM, KARAOKE ACCOMPANIMENT SOUND, APPRECIATION OF MUSIC |
| MUSICAL SCORE DATA (COMMON) | |

FIG. 4

| TONE COLOR DATA | FOR USES OF INCOMING CALL MELODY, HOLD SOUND |
| --- | --- |
| | FOR USES OF BGM, KARAOKE ACCOMPANIMENT SOUND, APPRECIATION OF MUSIC |

| TONE COLOR ASSIGNMENT DATA (COMMON) |
| --- |

| TEMPO DATA | FOR USES OF INCOMING CALL MELODY, HOLD SOUND |
| --- | --- |
| | FOR USES OF BGM, KARAOKE ACCOMPANIMENT SOUND, APPRECIATION OF MUSIC |

| PLAYBACK START POSITION DATA | FOR USE OF INCOMING CALL MELODY |
| --- | --- |
| | FOR USES OF HOLD SOUND, BGM, KARAOKE ACCOMPANIMENT SOUND, APPRECIATION OF MUSIC |

| PITCH SHIFT DATA | FOR USES OF INCOMING CALL MELODY, HOLD SOUND |
| --- | --- |
| | FOR USES OF BGM, KARAOKE ACCOMPANIMENT SOUND, APPRECIATION OF MUSIC |

| MUSICAL SCORE DATA (COMMON) |
| --- |

FIG. 5

NOTE (1 WORD)

| Oct | Note | PART | INTERVAL | LENGTH |
| --- | --- | --- | --- | --- |

REST (1 WORD)

| REST CODE | PART | INTERVAL | |
| --- | --- | --- | --- |

FIG. 6

VOICE RAM

| TONE COLOR 1 | WAVEFORM PARAMETER 1<br>ENVELOPE PARAMETER 1<br>MODULATION PARAMETER 1<br>EFFECT PARAMETER 1 |
|---|---|
| TONE COLOR 2 | WAVEFORM PARAMETER 2<br>ENVELOPE PARAMETER 2<br>MODULATION PARAMETER 2<br>EFFECT PARAMETER 2 |
| ⋮ | ⋮ |
| TONE COLOR 8 | WAVEFORM PARAMETER 8<br>ENVELOPE PARAMETER 8<br>MODULATION PARAMETER 8<br>EFFECT PARAMETER 8 |

FIG. 7

TONE COLOR ASSIGNMENT DATA

| PART 1 →<br>TONE COLOR 1 | PART 2 →<br>TONE COLOR 5 | PART 3 →<br>TONE COLOR 8 | PART 4 →<br>TONE COLOR 2 |
|---|---|---|---|

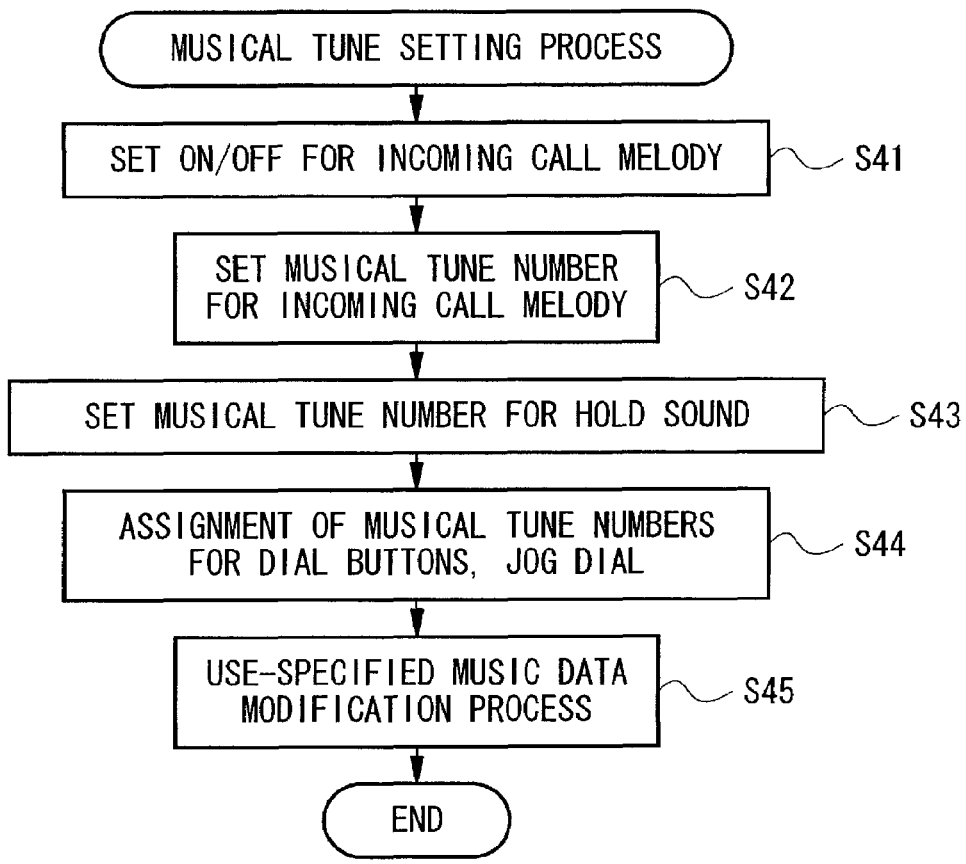

TELEPHONE TERMINAL

This application is the National Phase of International Application PCT/JP01/01564 filed 01 Mar. 2001 which designated the U.S. and that International Application published under PCT Article 21(2) in English.

TECHNICAL FIELD

This invention relates to telephone terminal devices such as portable telephones having music playback functions for reproducing musical tone signals of musical tunes in response to reception of incoming call signals.

BACKGROUND ART

Conventionally, there are provided various types of telecommunication systems for use in telephone terminal devices such as analog cellular systems and digital cellular systems that are known as personal digital cellular telecommunication system (PDC) and personal handyphone system (PHS). In response to incoming calls, telephone terminal devices that are carried by users produce incoming call sounds to notify users of reception of incoming calls from calling parties. As incoming call sounds, telephone terminal devices produce beep sounds, which are offensive to ears of users. Recently, telephone terminal devices are developed to produce musical tones representing melodies of musical tunes, which are substituted for conventional beep sounds. Incidentally, the aforementioned musical tones are called incoming call melody sounds.

Telephone terminal devices that are capable of producing incoming call melody sounds each have a music playback section for the purpose of reproduction of music data representing a melody of a musical tune which is produced as incoming call melody sound. Such a music playback section can be used for the other purpose of generating musical tone signals, other than the purpose of notifying the user of incoming calls. That is, musical tone signals are used to meet various types of uses such as generation of background music (BGM) and hold sound as well as playback of music for appreciation. Hence, musical tone signals must be specifically processed to suit the aforementioned uses. In order to use musical tone signals for generation of incoming call melody sound, for example, musical tone signals are sharpened to allow the user hearing incoming call melody sound even in noisy environment. In order to cope with various types of uses, it is preferable that various types of music data suited for various types of uses are provided for telephone terminal devices. That is, various types of use-specified music data are installed in telephone terminal devices in advance.

To cope with different uses, it is required that various types of music data regarding the same musical tune are stored in telephone terminal devices. This raises a necessity to increase storage capacities for storing multiple music data in telephone terminal devices. However, recent telephone terminal devices, particularly portable telephones, must be downsized in weight and size. Due to the downsizing of telephone terminal devices, it is difficult to provide relatively large spaces for large-capacity storage. Even though telephone terminal devices allow installation of large-capacity storage, there is a problem that the total manufacturing cost is increased because of the installation of large-capacity storage.

It is an object of the present invention to provide a telephone terminal device that is capable of reproducing musical tone signals for different uses with a reduced storage for storing music data.

DISCLOSURE OF INVENTION

A telephone terminal device such as a portable telephone deals with preset musical tunes or other musical tunes that are transferred or downloaded from the external system. Normally, the telephone terminal device performs music playback processes based on use-specified music data in which tempos, tone colors, and pitches are specifically processed to suit different uses while tone color assignment and musical score are commonly shared among different uses. Based on use-specified music data, the telephone terminal device reproduces musical tone signals for a specific use such as production of incoming call melody sound for notification of an incoming call, hold sound, background music (BGM) during conversation in progress, karaoke accompaniment sound, and music for appreciation. In addition, it is possible to reproduce common-use music data to suit a specific use. That is, common-use music data are partially modified in tone color, tempo, and pitch to suit a specific use, so that modified music data are used for reproduction. Herein, a playback start position is also modified to suit a specific use, so that musical score data after the playback start position are sequentially transferred to the music playback section. Because musical score data containing numerous data elements are commonly shared among different uses with respect to the same musical tune, it is possible to remarkably reduce the storage capacity required for the music playback section.

BRIEF DESCRIPTION OF DRAWINGS

FIG. 4 shows the configuration of music data used by the portable telephone;

FIG. 5 shows configurations of note data and rest data contained in musical score data;

FIG. 6 shows an example of contents of eight tone colors in tone color data;

FIG. 7 shows the configuration of tone color assignment data showing assignment of tone colors to respective parts of a musical tune;

FIG. 11 is a flowchart showing a musical tune setting process that is executed by the system CPU to select a musical tune for use in production of incoming call melody sound or hold sound;

FIG. 12 shows an arrangement of dial buttons including numeric buttons and code buttons to which musical tune numbers are respectively assigned;

BEST MODE FOR CARRYING OUT THE INVENTION

This invention will be described in further detail by way of examples with reference to the accompanying drawings.

This invention provides various embodiments for realization of telephone terminal devices each having storage for storing multiple music data for different uses. That is, the first embodiment is designed to store music data for the purpose of different uses in a storage; and the second embodiment is designed to store music data that are commonly shared by different uses in a storage. The storage is basically constituted by a read-only memory (ROM) for storing preset music data and a random-access memory (RAM) for storing additional music data. By using a RAM of the storage, a telephone terminal device is capable of accessing a center (namely, computer facilities for distribution of music data) to download use-specified music data or common-use music data that are commonly shared among different uses. Now, a description will be given with respect to the outline of the download operation of a portable telephone that downloads music data from the center in accordance with the present invention with reference to FIG. 1.

Figure 1:
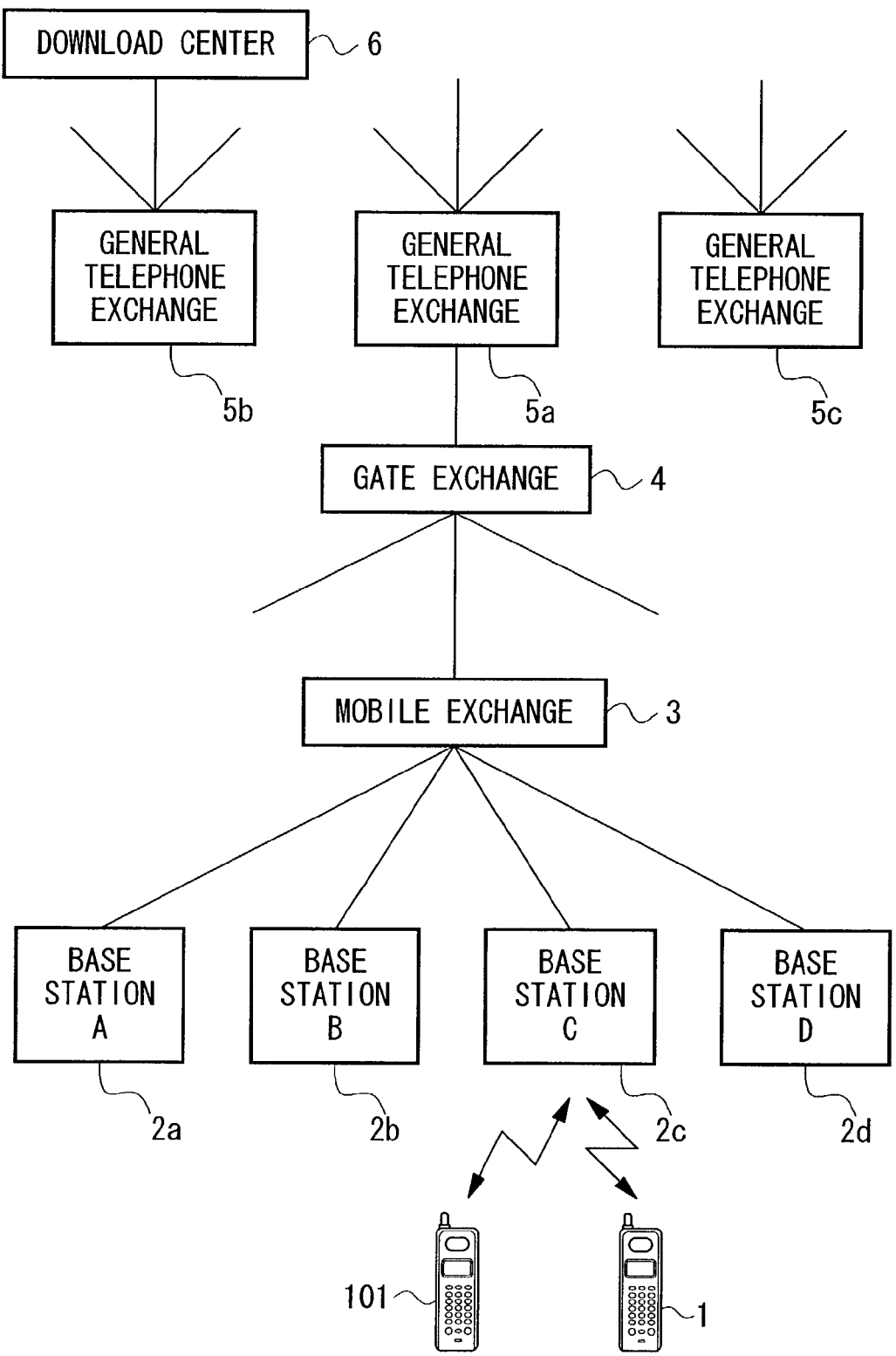
FIG. 1 is a conceptual system diagram showing a telecommunication system that allows downloading of music data to portable telephones via communication lines and telephone networks.

In general, the cellular system that is one of communication service systems for portable telephones employs the small zone system in which numerous radio communication zones are arranged in each service area. Base stations A–D (designated by reference numerals 2a–2d) are located to cover and manage radio communication zones. FIG. 1 shows two portable telephones 1 and 101 corresponding to mobile stations, which are arranged in a prescribed zone managed by a prescribed base station. When a portable telephone makes communication with a telephone terminal connected with the general telephone network, it is connected with a mobile exchange 3 by way of a base station, so that communication is relayed from the mobile exchange 3 to a high-level exchange that is capable of establishing connection with the general telephone network. That is, the portable telephone is connected via radio communication lines with a base station, which is connected with the general telephone network to allow communication with the telephone terminal. Thus, the user of the portable telephone is able to make conversation with the subscriber of the telephone terminal via the general telephone network.

FIG. 1 shows an example of the aforementioned cellular system wherein both the portable telephones 1 and 101 are located in the same radio communication zone managed by the base station C within the base stations A–D. During communications in progress, the portable telephones 1 and 101 are connected with the base station C via radio communication lines. The portable telephones 1 and 101 output uplink signals, which are used for communications with desired telephone terminals and for registration of locations thereof. The uplink signals are received and processed by the base station C. As described above, the base stations A–D manage different radio communication zones, peripheral areas of which are partially and mutually overlapped with each other. The base stations A–D are connected with the mobile exchange 3 via multiplexed lines, and the mobile exchange 3 is connected with a gate exchange 4. Normally, outputs of plural mobile exchanges are concentrated onto a single gate exchange, which is connected with the general telephone network. In FIG. 1, the general telephone network contains three general telephone exchanges 5a–5c. The gate exchange 4 is connected with the general telephone exchange 5a. There are provided plural gate exchanges that are mutually connected together via trunk transmission lines. In addition, the general telephone exchanges 5a–5c are located in respective areas, so that they are mutually connected together via trunk transmission lines. The general telephone exchanges 5a–5c are each connected with numerous general telephone terminals. In FIG. 1, a download center 6 is connected with the general telephone exchange 5b.

The download center 6 accumulates the music data of numerous musical tunes, which are updated at any time or to which new musical tunes are added at all times. The music data are basically classified into use-specified music data suited in different uses, and common-use music data commonly shared among different uses. The present embodiment is designed such that the portable telephones 1 and 101 are capable of downloading from the download center 6 the use-specified music data and/or common-use music data. In order to download music data from the download center 6, the user presses numeric keys on the portable telephone 1 to dial a telephone number of the download center 6. Thus, a call connection is established by way of transmission lines among the portable telephone 1, base station C, mobile exchange 3, gate exchange 4, general telephone exchanges 5a and 5b, and download center 6, so that the user of the portable telephone 1 is able to communicate with the download center 6. The prescribed menu is displayed on the screen of the display of the portable telephone 1, so that the user operates keys (or dial buttons) to enable downloading of the music data of a desired musical tune from the download center 6. The downloaded music data contain musical score data and tone color data. Incidentally, it is possible to download tone color data of plural tone colors, which are specified in uses or commonly shared among different uses. Alternatively, it is possible to download use-specified musical score data or common-use musical score data.

Figure 2:
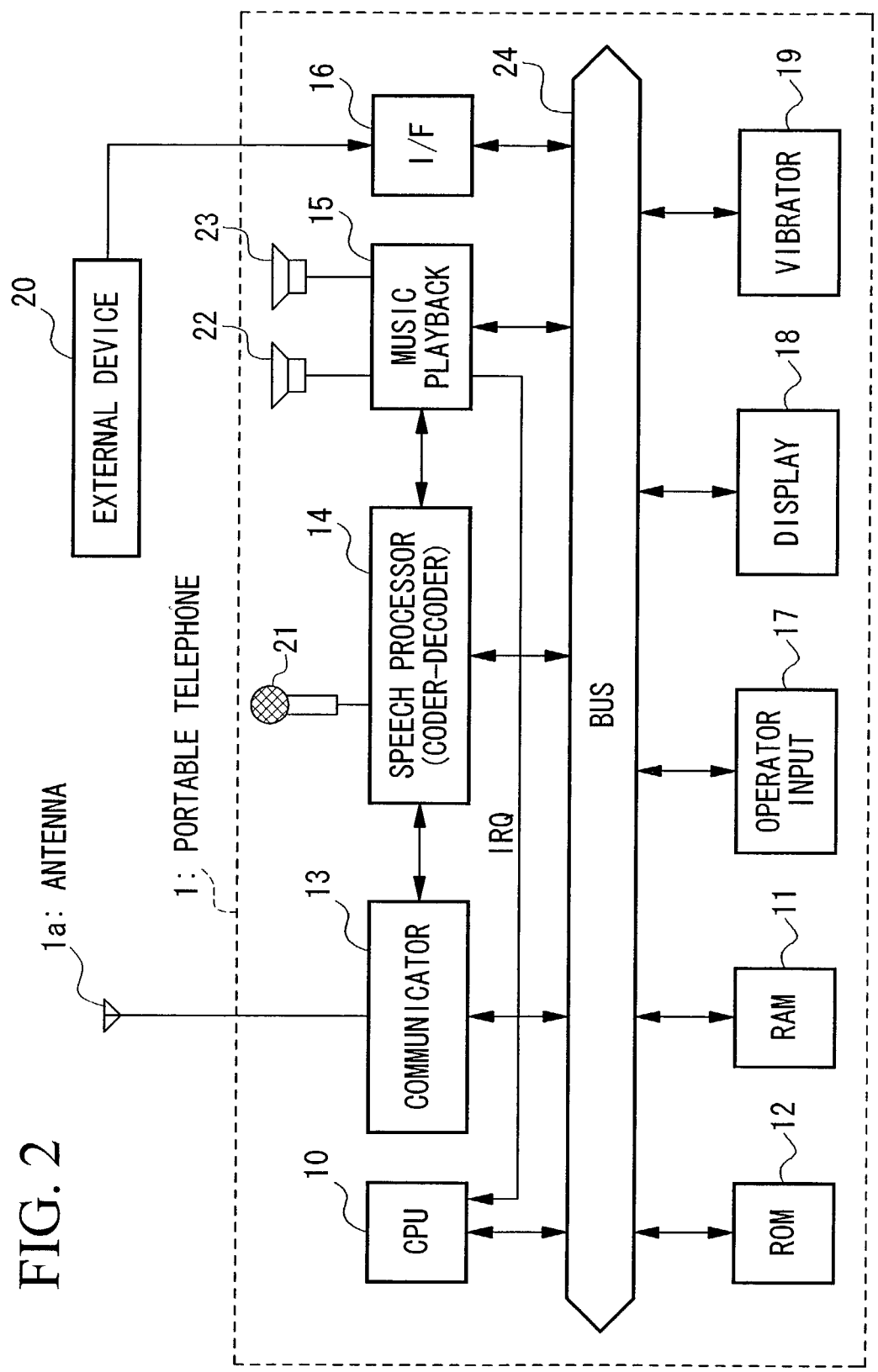
FIG. 2 is a block diagram showing the configuration of a portable telephone that is an example of the telephone terminal device of this invention.

Next, the configuration of a portable telephone realizing the telephone terminal device of this invention will be described with reference to FIG. 2.

That is, a portable telephone 1 has a retractable antenna 1a, which can be retracted inside of the body for convenience in a portable use at all times. In a communication mode, the antenna 1a is stretched to improve the antenna gain. The antenna 1a is connected with a communicator 13 having modulation and demodulation functions as well as frequency conversion functions. A central processing unit (CPU) 10 is a system control that performs overall controls on several blocks and sections of the system of the portable telephone 1 by executing telephone function programs. In addition, the system CPU 10 has a timer that indicates a lapsed time during operation and issues a timer interrupt every prescribed time interval. Further, the system CPU 10 performs operations regarding music playback processes, details of which will be described later. A system random-access memory (RAM) 11 contains a music data storage area, a user setup data storage area, and a work area, wherein the music data storage area stores music data containing musical score data and tone color data, which are downloaded from the download center 6 connected with the general telephone network. A system read-only memory (ROM) 12 stores a variety of programs and data, namely, various telephone function programs executed by the system CPU 10 for reception and transmission of calls, programs representing operations of music playback processes, and preset music data.

The communicator 13 demodulates signals received by the antenna 1a, and it also modulates signals to be transmitted via the antenna 1a. That is, the communicator 13 demodulates signals received by the antenna 1a to produce incoming call signals, which are then decoded by a speech processor 14 having a coder-decoder. In addition, the user's speech is picked up by a microphone 21 and is converted to speech signals, which are then subjected to compressive coding by the speech processor 14. The speech processor 14 performs high-efficiency compressive coding/decoding on the speech signals for transmission. That is, the speech processor 14 provides a coder-decoder based on the code excited linear predictive coding (CELPC) system or adaptive differential pulse-code modulation (ADPCM) system. The music playback section 15 reproduces music data to produce incoming call sound and hold sound as well as background music (BGM), music for appreciation, and karaoke accompaniment sound. Incidentally, it is possible to simultaneously reproduce speech signals and music data as BGM. That is, a speaker 22 produces the speech of received speech signals, which is accompanied with the BGM. In addition, it is possible to transmit music data of BGM to a telephone terminal of the person who are presently communicating with the user of the portable telephone 1. The portable telephone 1 provides two speakers 22, 23 used for different purposes. That is, the received speech signals are mixed with music data representative of the BGM or hold sound, so that the speaker 22 produces the speech of received speech signals that is accompanied with BGM or hold sound. In addition, the speaker 23 produces incoming call sound, music for appreciation, or karaoke accompaniment sound.

During the playback of music data in progress, a vacant area emerges and increases in size in a storage that is provided inside of the music playback section 15 to store music data. When the vacant area of the prescribed size emerges in the storage, the music playback section 15 issues an interrupt request signal (IRQ) to the system CPU 10. Hence, the system CPU 10 accesses the system RAM 11 or system ROM 12 to read the next portion of music data following a part of music data that were precedently written to the storage, so that the next portion of music data is transferred to the music playback section 15. An interface (I/F) 16 is used to input music data from an external device 20 such as a personal computer. An operator input section 17 provides numeric keys (or dial buttons) representing numerals '0' to '9', function keys, and other controls such as a jog dial. A display 18 is a liquid crystal display for displaying telephone function menus and for displaying images and characters in response to operations on dial buttons and/or jog dial on the screen. A vibrator 19 generates vibration, which is substituted for incoming call sound, in response to reception of an incoming call. The vibrator 19 is automatically activated to vibrate the body of the portable telephone 1 to notify the user of reception of an incoming call. All the function blocks of the system of the portable telephone 1 are connected with a bus 24 to send or receive data and/or instructions.

As described above, the portable telephone 1 of the present embodiment incorporates the music playback section 15 for reproduction of music data as incoming call melody sound that is produced to notify the user of reception of an incoming call as well as BGM that is accompanied with the speech of received speech signals. In addition, the music playback section 15 reproduces music data to play back a musical tune, so the user (or other listeners) is able to listen to the music. Further, the music playback section 15 reproduces music data to produce karaoke accompaniment sound, along which the user is able to sing a song with the microphone 21. In this case, the karaoke accompaniment sound and vocal sound are subjected to mixing by the portable telephone 1.

Figure 3:
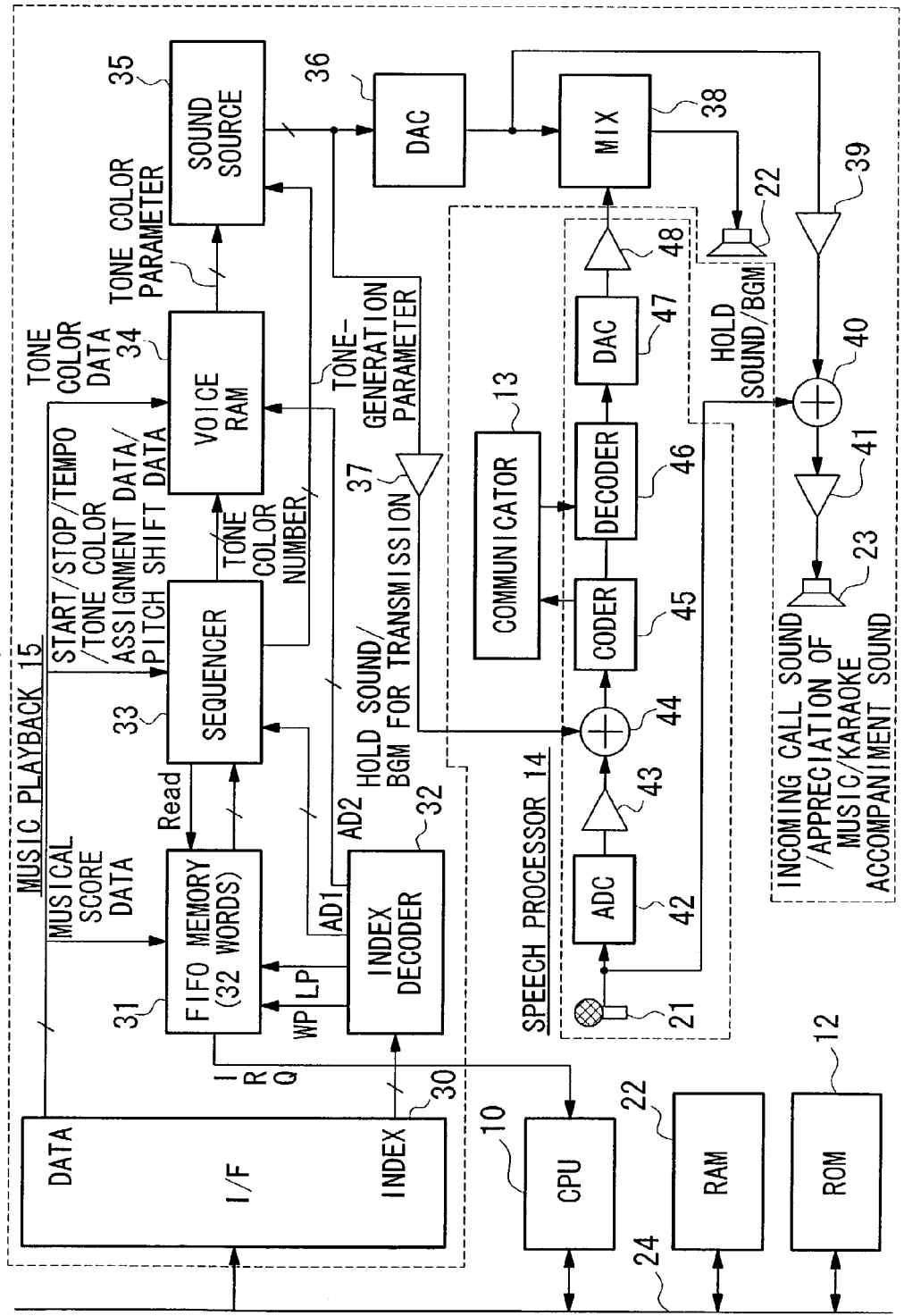
FIG. 3 is a block diagram showing detailed configurations of a speech processor and a music playback section of the portable telephone.

FIG. 3 shows internal configurations of the speech processor 14 and music playback section 15 in detail.

The music playback section 15 has an interface (I/F) 30 for receiving various kinds of data on the bus 24. That is, the interface 30 receives index data and music data containing musical score data and tone color data, wherein the index data provide indications with respect to types of input data. The index data are separated from the other data, which are output via an output terminal DATA. The index data are output via an output terminal INDEX. An FIFO (first-in-first-out) memory 31 is used to exclusively store musical score data and has a prescribed storage capacity of thirty-two words, for example. That is, musical score data written first are read first, so that they are sequentially read from the FIFO memory 31 in a first-in-first-out manner. When a vacant area of a prescribed size emerges in the FIFO memory 31 from which musical score data are sequentially read, the FIFO memory 31 issues an interrupt request signal (IRQ) to the system CPU 10. That is, the FIFO memory 31 requests the system CPU 10 to transfer the next portion of musical score data following a part of musical score data previously written thereto.

An INDEX decoder 32 decodes index data to translate the type of data output from the interface 30. When the INDEX decoder 32 detects that musical score data are output from the output terminal DATA of the interface 30, it supplies write pulses (WP) to the FIFO memory 31 to enable write operations of musical score data. When the INDEX decoder 32 detects that IRQ Point data are output from the output terminal DATA of the interface 30, it supplies latch pulses (LP) to the FIFO memory 31 to enable latch operations of IRQ Point data. The IRQ Point data sets an interrupt point designating the number of words representing the size of a vacant area of the FIFO memory 31 in order to issue an interrupt request signal (IRQ) for requesting the system CPU 10 to initiate the write operation with respect to the next portion of musical score data. A sequencer 33 receives a start signal (Start), a stop signal (Stop), tempo data (Tempo), tone color assignment data, and pitch shift data from the output terminal DATA of the interface 30. In this case, the INDEX decoder 32 supplies index data AD1 to inform the sequencer 33 that one of the aforementioned signals and data is output from the interface 30. A Voice RAM 34 is used as a tone color data storage that exclusively stores tone color data output from the output terminal DATA of the interface 30. The INDEX decoder 32 supplies index data AD2 to inform the Voice RAM 34 that the tone color data are output from the interface 30.

The sequencer 33 reproduces musical tone signals based on musical score data stored in the FIFO memory 31. In order to initiate reproduction of musical tone signals, the sequencer 33 applies read pulses (Read) to the FIFO memory 31 to sequentially read musical score data in a first-in-first-out manner. In addition, the sequencer 33 sets to a sound source 35 tone-generation parameters for notes and rests of musical score data in response to time information contained in musical score data. The aforementioned tone color assignment data designate tone color numbers showing tone colors assigned to respective parts of a musical tune. In response to tone color assignment data output from the output terminal DATA of the interface 30, the sequencer 33 supplies tone color numbers to the Voice RAM 34 to set tone color parameters to the sound source 35 with respect to respective parts of a musical tune.

The Voice RAM 34 has a relatively small storage capacity for storing multiple tone color data of eight tone colors, for example. The sound source 35 is designed to reproduce a musical tune having four parts, so that it is capable of simultaneously producing four musical tones using different tone colors. In accordance with tone color assignment data, tone colors read from the Voice RAM 34 are respectively assigned to four parts of a musical tune. Tone-generation parameters given from the sequencer 33 designate tone pitches and note lengths for musical tone signals, which are generated by the sound source 35 with respect to each of four parts of a musical tune. Musical tone signals regarding four parts of a musical tune are supplied to a digital-to-analog converter (DAC) 36, wherein they are converted to analog musical tone signals in conformity with prescribed reproduction timings.

In order to use musical tone signals for generation of BGM, musical tone signals are mixed together with received speech signals, which are decoded by the speech processor 14, by a mixer 38, so that the speaker 22 reproduces the received speech accompanied with musical tones that are produced as BGM. In order to use musical tone signals for generation of hold sound, the mixer 38 is inactivated so that musical tone signals are not mixed with received speech signals, which are decoded by the speech processor 14. Therefore, the speaker 22 produces only the musical tones based on musical tone signals output from the mixer 38. The portable telephone 1 of the present embodiment is designed to use musical tone signals reproduced by the sound source 35 as hold sound or BGM for transmission. In order to allow transmission of musical tone signals to a telephone terminal of the person during conversation in progress, the sound source 35 supplies musical tone signals to the speech processor 14 via an amplifier 37.

In order to use musical tone signals as incoming call melody sound or music for appreciation, musical tone signals output from the digital-to-analog converter 36 are supplied to the speaker 23 via an amplifier 39, a mixer 40, and an amplifier 41. In order to use musical tone signals as karaoke accompaniment sound, musical tone signals output from the digital-to-analog converter 36 are supplied to the mixer 40 via the amplifier 39. The mixer 40 performs mixing on musical tone signals mixed together with vocal signals representing the vocal sound which is picked up by the microphone 21 connected with the speech processor 14. Then, mixed signals are supplied to the speaker 23 via the amplifier 41.

Next, a description will be given with respect to operations of the speech processor 14 with reference to FIG. 3. The microphone 21 picks up the user's speech to convert it to speech signals, which are transmitted to a telephone terminal of the person who is presently communicating with the user of the portable telephone 1. The speech signals are supplied to an analog-to-digital converter (ADC) 42 in which they are converted to digital speech signals, which are then supplied to a mixer 44 via an amplifier 43. The mixer 44 receives the foregoing musical tone signals, which are reproduced by the music playback section 15, via an amplifier 37. The output of the mixer 44 is subjected to high-efficiency compressive coding by a coder 45 that operates based on the code excited linear predictive coding (CELPC) system, for example. Then, the output of the coder 45 is supplied to the communicator 13, from which it is transmitted via the antenna 1a. The communicator 13 receives speech signals representing the speech of the person of the telephone terminal that is presently communicating with the portable telephone 1, so that received speech signals are forwarded to the speech processor 14. The received speech signals are subjected to high-efficiency compressive coding. Hence, a decoder 46 of the CELPC system decodes them to produce received speech data, which are then converted to analog received speech signals by a digital-to-analog converter 47. The analog received speech signals are supplied to the mixer 38 of the music playback section 15 via an amplifier 48.

In order to use musical tone signals, which are reproduced by the music playback section 15, as BGM, the mixer 44 performs mixing on transmitting speech signals representing the user's speech picked up by the microphone 21 and transmitting BGM signals given from the music playback section 15. That is, transmitting speech signals output from the amplifier 43 are mixed together with transmitting BGM signals output from the amplifier 37. Then, mixed signals representing the user's speech accompanied with BGM are transmitted to the telephone terminal by means of the coder 45 and communicator 13. In order to use musical tone signals as hold sound, the amplifier 43 does not output transmitting speech signals to the mixer 44. Hence, the mixer 44 receives only the musical tone signals, namely transmitting hang-on sound signals, from the amplifier 37 of the music playback section 15. Thus, the mixer 44 outputs transmitting hold sound signals to the telephone terminal by means of the coder 45 and communicator 13.

Next, concrete operations of the speech processor 14 and music playback section 15 will be described in connection with reproduction of music data. The portable telephone 1 initiates reproduction of music data for generation of incoming call sound, BGM sound, and hold sound. In addition, musical tones are reproduced from music data to play music in a music playback mode, or accompaniment sounds are reproduced from music data to allow the user singing a song in a karaoke mode. In each of the aforementioned cases, the portable telephone 1 starts playback of a musical tune after completion of initialization of music data. In order to reproduce musical tones as incoming call sound or hold sound, the music data of a musical tune that is previously selected at an appropriate timing are initially set to the music playback section 15. In order to reproduce musical tones as BGM, music, or karaoke accompaniment sound, the music data of a musical tune that is newly selected by the user for playback are initially set to the music playback section 15. For convenience' sake, the music data of a selected musical tune are stored in the system RAM 11 or system ROM 12 in advance.

To start playback on the portable telephone 1, the music data of a selected musical tune are read from the system RAM 11 or system ROM 12, so that read music data are forwarded to the music playback section 15 via the bus 24.

FIG. 4 shows an example of the configuration of music data. That is, music data are constituted by tone color data of eight tone colors, tone color assignment data showing assignment of tone colors to respective parts of a musical tune, tempo data representing a tempo or progression speed of music, playback start position data for designating a playback start point of a musical tune from which playback is to be started, pitch shift data for shifting pitches of musical tones reproduced, and musical score data in which note data and rest data of four parts of a musical tune are arranged in a reproduction order. Among the aforementioned data, tone color assignment data and musical score data are commonly used for different purposes, regardless of uses of music data. Because musical score data occupy a large portion of music data, it is preferable to provide musical score data for the common purpose. Hence, even though various types of music data are prepared for different uses respectively, it is possible to suppress the total amount of music data stored in a memory of the portable telephone. To cope with different uses of a same single musical tune, there are provided multiple sets of tone color data, tempo data, playback start position data, and pitch shift data with respect to the same music data. Since musical score data are commonly shared by different uses, specific ID information assigned to music data is added to musical score data. Thus, it is possible to commonly share the same musical score data for different uses.

In order to use musical tones for incoming call melody sound or hold sound, tone color data are modified to improve the clearness with respect to reproduced musical tone signals. Concretely speaking, the clearness is improved by modifying waveform parameters or by increasing attack rates with respect to sounds of pianos and violins, for example. Thus, the user or the other person is able to easily and clearly discriminate between incoming call melody sound and hold sound. In order to use musical tones for BGM, music for appreciation, or karaoke accompaniment sound, tone color data are not modified so that music data are reproduced with fidelity to original tone colors. In order to use musical tones for incoming call melody sound or hold sound, it is possible to further modify parameters or effects of musical tone signals such as to further improve the clearness. That is, tone volume levels are reduced by reducing attack levels and sustain levels in waveforms of musical tones, so that the user or the other person do not have uncomfortable feeling in listening to incoming call melody sound or hold sound. In addition, the portable telephone automatically turns off reverb effects and chorus effects to improve the clearness. Thus, the user or the other person is able to easily and clearly discriminate between incoming call melody sound and hold sound, so that they would not feel irritation on the portable telephone.

In the use for incoming call melody sound or hold sound, tempo data are increased to make a tempo faster so that musical tones are improved in clearness and are easily heard by the user or the other person without irritation. Because, incoming call melody sound is produced for the purpose of notification of an incoming call, so that the user does not hear it in a leisurely fashion. In other words, it is preferable to increase progression of a melody of a musical tune that is produced as incoming call melody sound. In the use for BGM, music for appreciation, or karaoke accompaniment sound, tempo data are not varied so that music data are reproduced with fidelity to the original tempo.

It is necessary to set the playback start position data in consideration of the property of incoming call melody sound that is produced for the purpose of notification of an incoming call and that the user does not hear in a leisurely fashion. Hence, it is preferable to set the playback start position data such that a musical tune is reproduced from a climax section rather than an introduction section thereof. In particular, in the use for incoming call melody sound, it is preferable to set the playback start position data designating the climax section of a musical tune. In other uses, it is preferable to set the playback start position data designating the introduction section of a musical tune such that music data can be accurately reproduced with fidelity to the original musical tune.

In the use for incoming call melody sound or hold sound, pitch shift data are increased to shift up pitches so that musical tones are improved in clearness and are easily heard by the user or the other person without irritation. In the use for BGM or music for appreciation, pitch shift data are set to ±0 so that music data are reproduced with fidelity to the original musical tune. In the use for karaoke accompaniment sound, the portable telephone allows the user to arbitrarily designate pitch shift data at any time.

Musical score data of music data are constituted by note data designating notes and rest data designating rest symbols, examples of which are shown in FIG. 5. That is, note data of one word are constitute by an octave code (Oct), a note code (Note), a part number designating a part to which a note belongs, an interval that is a time length counting from one note to the next note or rest, and note length information. In addition, rest data of one word are constituted by a rest code designating the type of a rest, a part number designating a part to which the rest belongs, and an interval that is a time length counting from one rest to the next note or rest.

In FIG. 3, the interface 30 inputs music data sent onto the bus 24, so that tone color data are delivered and written to the Voice RAM 34. It is described above that tone color data are required for reproduction of music data and are provided for at least eight tone colors. FIG. 6 shows an example of assignment of eight tone colors, namely tone color 1 to 8, in the Voice RAM 34. Herein, tone color data are each constituted by waveform parameters, envelope parameters, modulation parameters, an effect parameter, and other parameters (not specified). That is, eight tone colors each have a specific set of parameters. Among the aforementioned parameters, waveform parameters designate musical tone waveforms, which differ by each type of the sound source 35. In the case of a PCM sound source having a waveform table, for example, waveform parameters designate any one of waveforms listed on the waveform table. In the case of an FM sound source, waveform parameters designate algorithms for calculations of frequency modulation. Envelope parameters designate attack rates, decay rates, sustain levels, and release rates. Modulation parameters designate velocity or depth in vibrato or tremolo, for example. Effect parameters designate reverb, chorus, and variation, for example.

The interface 30 inputs a start signal (Start), a stop signal (Stop), tempo data (Tempo), tone color assignment data, and pitch shift data, which are accompanied with index data respectively. The INDEX decoder 32 decodes index data to produce index data AD1. In response to index data AD1, the sequencer 33 inputs the aforementioned signals and data. That is, the sequencer 33 inputs tone color assignment data designating tone color parameters, which are read from the Voice RAM 34 and are set to the sound source 35. FIG. 7 shows an example of the configuration of tone color assignment data. When the sound source 35 is designed to reproduce four parts, namely part 1 to 4, tone color assignment data show tone color numbers designating four tone colors that are respectively assigned to four parts. When the sequencer 33 outputs a tone color number specifically assigned to each part, the corresponding tone color parameters are read from the Voice RAM 34 and are set to the sound source 35 with respect to each part. Hence, tone colors are adequately and respectively set with respect to four parts of a musical tune in the sound source 35.

With respect to reproduced music data, tone color data are transferred and written to the Voice RAM 34. Though the present embodiment sets a small storage capacity for the Voice RAM 34 to store tone color data of at least eight tone colors, the Voice RAM 34 is capable of storing all the tone color data that are required for reproduction of music data. That is, even though the Voice RAM 34 is limited in storage capacity, it is possible to reproduce a musical tune in a high quality on the basis of high-quality tone color data containing numerous data elements. In addition, the present embodiment is designed such that desired tone color data are selected from plural tone color data stored in the system RAM 11 in advance and are written to the Voice RAM 34. Thus, the portable telephone 1 is capable of reproducing a musical tune by using various types of tone colors.

The interface 30 inputs music data containing musical score data that are accompanied with index data. The INDEX decoder 32 decodes the index data to supply write pulses (WP) to the FIFO memory 31. In response to write pulses, musical score data of thirty-two words are sequentially written to the FIFO memory 31. Herein, thirty-two words correspond to only a part of a musical score data representing a single musical tune entirely. In addition, thirty-two words are counted from the playback start position of musical score data.

To initiate the sound source 35 reproducing musical tone signals, musical score data containing note data and rest data shown in FIG. 5 are sequentially read from the FIFO memory 31. In progression of reproduction, a vacant area emerges and increases in size in the FIFO memory 31 in response to the amount of read data. Initially, the FIFO memory 31 stores thirty-two words corresponding to only a head portion of musical score data; therefore, it is necessary to perform write operations with respect to the next portion of musical score data, which are written into the vacant area. That is, by repeating write operations to successively write following portions of musical score data to the FIFO memory 31, it is possible to entirely reproduce musical score data for a long time even though musical score data contain numerous data elements. The music playback section 15 performs reproduction of music data based on the aforementioned operating principle. Therefore, the present embodiment introduces interrupt request point data (namely, IRQ Point data), which is set prior to reproduction.

IRQ Point data designates the number of words corresponding to the vacant area of the prescribed size, which emerges in the FIFO memory 31. That is, when the vacant area increases to reach the prescribed size designated by the IRQ Point data, the FIFO memory 31 issues an interrupt request signal (IRQ) that requests the system CPU 10 to initiate write operations to write the next portion of musical score data. When IRQ Point data is set close to zero word, the interruption frequency is increased, however, it is possible to decrease the number of words required for writing the next portion of musical score data to the FIFO memory 31, so that the system CPU 10 is reduced in processing load. When IRQ Point data is set close to thirty-two words, it is possible to decrease the interruption frequency, however, the number of words required for writing the next portion of musical score data is increased so that the system CPU 10 is increased in processing load. Because of the aforementioned reasons, it is preferable to set IRQ Point data in consideration of the processing speed of the system CPU 10.

The system CPU 10 issues a start signal to start reproduction of music data by the music playback section 15. Upon receipt of a start signal, the sequencer 33 applies read pulses (Read) to the FIFO memory 31 to read musical score data containing note data and rest data in a first-in-first-out manner. In the case of the note data, pitch data corresponding to octave codes and note codes, part numbers, and key-on data are set to the sound source 35 in conformity with timings based on tempo and an interval. Specifically, they are set to a sound source register provided inside of the sound source 35. Based on tone color parameters set to the part designated by the part number, the sound source 35 generates musical tone signals having tone pitches designated by pitch data. After lapse of note lengths of note data, the sequencer 33 sets key-off data to the sound source 35 with respect to the designated part. Thus, the sound source 35 performs mute processes on musical tones designated by note data. The aforementioned operations are repeatedly performed every time note data are read from the FIFO memory 31, so that the sound source 35 reproduces musical tone signals based on musical score data. Musical tone signals are sequentially forwarded to the digital-to-analog converter 36.

During the progression of reproduction of musical score data, a vacant area emerges and increases in size in the FIFO memory 31. When the size of the vacant area matches IRQ Point data, the FIFO memory 31 issues an interrupt request signal (IRQ) to the system CPU 10. Upon receipt of an IRQ, the system CPU 10 accesses the system RAM 11 or system ROM 12 to read the next portion of musical score data, which correspond to (31-IRQ Point) words, onto the bus 24. The next portion of musical score data is written to the vacant area of the FIFO memory 31 via the interface 30. That is, the system CPU 10 repeats write operations to write musical score data of (31-IRQ Point) words to the FIFO memory 31. Thus, even though musical score data contain numerous data elements, it is possible to successively write all the musical score data into the FIFO memory 31. Musical score data read from the FIFO memory 31 are reproduced by the sound source 35 in the prescribed tempo. As a result, even though the present embodiment employs the FIFO memory 31 whose storage capacity is limited to thirty-two words, it is possible to entirely reproduce musical score data that contain numerous data elements to realize high-quality reproduction of musical tones.

Suppose that the user sets the portable telephone 1 in an incoming call melody mode in which the music playback section 15 reproduces a musical tune in response to reception of an incoming call. In this case, music data of a musical tune whose melody is selected as incoming call melody sound in advance are read from the system RAM 11 or system ROM 12, and are supplied to the music playback section 15 in response to reception of an incoming call. The music playback section 15 proceeds to music playback processes on the basis of music data, so that the digital-to-analog converter 36 outputs analog musical tone signals, which are forwarded to the speaker 23 via the amplifier 39, mixer 40, and amplifier 41. Thus, the speaker 23 produces incoming call melody sound based on musical tone signals. In this case, the mixer 40 is inactivated so that musical tone signals are not mixed with other sound signals.

Suppose that the user operates a hold button (not shown) on the portable telephone 1 to allow the music playback section 15 to reproduce a melody of a musical tune as hold sound. In this case, the music data of a musical tune whose melody is selected as hold sound in advance are read from the system RAM 11 or system ROM 12 and are supplied to the music playback section 15. The music playback section 15 proceeds to music playback processes on the basis of music data, so that the digital-to-analog converter 36 outputs analog musical tone signals, which are forwarded to the speaker 22 via the mixer 38. Thus, the speaker 22 produces hold sound based on musical tone signals. At the same time, the sound source 35 provides musical tone signals for transmission (namely, transmitting hold sound signals) to a telephone terminal of the person who is presently communicating with the user of the portable telephone 1. The transmitting hold sound signals are supplied to the mixer 44 of the speech processor 14 via the amplifier 37. Thus, the transmitting hold sound signals are subjected to coding by the coder 45 and are then transmitted to the telephone terminal by means of the communicator 13.

Suppose that the user sets the portable telephone 1 to reproduce BGM, which is softly produced as background sound during conversation in progress, by the music playback section 15. In this case, the music data of a musical tune which is selected as BGM in advance are read from the system RAM 11 or system ROM 12 and are supplied to the music playback section 15. The music playback section 15 proceeds to music playback processes on the basis of music data, so that the digital-to-analog converter 36 outputs analog musical tone signals, which are forwarded to the mixer 38. In addition, received speech signals, which are decoded by the decoder 46, are supplied to the mixer 38 via the digital-to-analog converter 47 and amplifier 48 in the speech processor 14. The mixer 38 mixes together musical tone signals and received speech signals to produce mixed signals, which are forwarded to the speaker 22. At the same time, the sound source 35 provides musical tone signals for transmission (namely, transmitting BGM signals) to a telephone terminal of the person who is presently communicating with the user of the portable telephone 1. The transmitting BGM signals are supplied to the mixer 44 via the amplifier 37. In addition, the user's speech is picked up by the microphone 21 and is converted to speech signals for transmission (namely, transmitting speech signals), which are forwarded to the mixer 44 via the analog-to-digital converter 42 and amplifier 43. Thus, the mixer 44 mixes together transmitting BGM signals and transmitting speech signals to produce mixed signals, which are subjected to coding by the coder 45 and are then transmitted to the telephone terminal by means of the communicator 13. This allows the telephone terminal to reproduce received speech signals accompanied with BGM signals.

Suppose that the user sets the portable telephone 1 in a music playback mode in which the user is able to listen to music. In this case, the music data of a desired musical tune that is selected in advance for music appreciation are read from the system RAM 11 or system ROM 12 and are supplied to the music playback section 15. The music playback section 15 proceeds to music playback processes on the basis of music data, so that the digital-to-analog converter 36 outputs analog musical tone signals, which are forwarded to the speaker 23 via the amplifier 39, mixer 40, and amplifier 41. Thus, the speaker 23 produces musical tones of a musical tune based on musical tone signals. Herein, the mixer 40 is inactivated so that musical tone signals are not mixed with other sound signals.

Suppose that the user sets the portable telephone 1 in a karaoke mode in which a musical tune is performed in the form of karaoke accompaniment sound to allow the user singing a song. In this case, the music data of a musical tune that is selected as karaoke accompaniment sound in advance are read from the system RAM 11 or system ROM 12 and are supplied to the music playback section 15. The music playback section 15 proceeds to music playback processes on the basis of music data, so that the digital-to-analog converter 36 outputs analog musical tone signals, which are forwarded to the speaker 23 via the amplifier 39, mixer 40, and amplifier 41. Thus, the speaker 23 produces karaoke accompaniment sound based on musical tone signals. In conformity with karaoke accompaniment sound produced by the speaker 23, the user is able to sing a song for a selected musical tune with the microphone 21. Herein, the user's vocal sound is picked up by the microphone 21 and is converted to vocal sound signals, which are forwarded to the mixer 40. The mixer 40 mixes vocal sound signals together with musical tone signals to produce mixed signals, which are forwarded to the speaker 23 via the amplifier 41. Thus, the speaker 23 produces the user's vocal sound accompanied with karaoke accompaniment sound.

Incidentally, it is possible to download from the download center 6 or external device 20 a considerable amount of music data representing plural musical tunes used for different purposes, so that downloaded music data are stored in the system RAM 11. Within plural musical tunes, the user is able to arbitrarily select desired musical tunes for reproduction of incoming call melody sound, hold sound, BGM, music for appreciation, and karaoke accompaniment sound.

It is described above that prescribed tone colors are respectively assigned to parts of a musical tune in accordance with tone color assignment data prior to reproduction of music data. It is possible to modify the present embodiment such that tone color assignment data of each part are inserted into musical score data stored in the FIFO memory 31. In reproduction of music data, tone color assignment data are read from the FIFO memory 31 and are transferred to the sequencer 33. In response to tone color assignment data, the sequencer 33 supplies tone color numbers to the Voice RAM 34. The Voice RAM 34 normally stores tone color data of eight tone colors, the number of which is greater than the number (i.e., four) of parts of a musical tune to be reproduced. Hence, any one of eight tone colors can be selectively assigned to each of parts of a musical tune. Thus, tone color parameters corresponding to tone color numbers are read from the Voice RAM 34 and are set to the sound source register, which is provided for the part designated by tone color assignment data in the sound source 35. As a result, it is possible to change tone colors of musical tones with respect to prescribed parts in the sound source 35 during reproduction of a musical tune in progress.

As described above, inserting tone color assignment data of each part into musical score data allow the user to arbitrarily change the tone color with respect to each part during reproduction in progress. In addition, the user is able to select tone color data stored in the system RAM 11 and to transfer them to the Voice RAM 34. That is, the user is able to arbitrarily select each of eight tone colors stored in the Voice RAM 34. When the portable telephone 1 downloads from the download center 6 or external device 20 various types of tone color data used for different purposes, the user is able to select desired tone color data from among various types of downloaded tone color data stored in the system RAM 11, so that desired tone color data are transferred to the Voice RAM 34.

The above description is made with respect to the speech processor 14 and music playback section 15 of the portable telephone 1 of the first embodiment of the present invention.

Next, a description will be given with respect to the second embodiment of the present invention. The second embodiment employs the portable telephone whose hardware configurations are shown in FIGS. 2 and 3 similarly to the first embodiment.

The second embodiment is characterized in that music data are not provided specifically for different uses but are commonly used for different purposes. To cope with different uses, the second embodiment modifies music data to suit different uses in reproduction. That is, the system CPU 10 performs music data modification processes by running reproduction manner modification programs that are preset to the system ROM 12. To run reproduction manner modification programs, the system CPU 10 discriminates the type of a use for which music data are to be reproduced so that music data are modified to suit the discriminated type of the use. Thus, it is possible to reproduce musical tone signals for a specific use on the basis of common music data.

The portable telephone 1 of the present embodiment is designed to cope with five uses, each of which is to be discriminated. Namely, a first use is to produce incoming call melody sound in response to reception of an incoming call; a second use is to produce hold sound when the user operates the hold button; a third use is to produce BGM when the user makes BGM setup during conversation in progress; a fourth use is to play back a musical tune for music appreciation; and a fifth use is to produce karaoke accompaniment sound.

In response to the discriminated type of the use, modification is effected on tone color data, tempo data, playback start position data, and pitch shift data in music data. When the system CPU 10 discriminates the first or second use in which incoming call melody sound or hold sound is to be produced based on music data, it is necessary to improve the clearness in sound quality in reproduction of musical tone signals. In that case, modification is effected on waveform parameters with respect to musical tones of prescribed musical instruments such as the piano and violin. To further improve the clearness in audition, it is necessary to increase attack rates of musical tone waveforms. When the system CPU 10 discriminates the third, fourth, or fifth use in which the BGM, music for appreciation or karaoke accompaniment sound is reproduced based on common music data, it is necessary to accurately reproduce music data with fidelity to the original musical tune. That is, it is preferable not to modify tone color data.

In the uses of incoming call melody sound and hold sound, modification is effected on tone volume levels by reducing attack levels and sustain levels of musical tone waveforms without making the user to feel uncomfortableness, so that musical tones are improved in clearness and audition. In addition, it is possible to turn off reverb effects and chorus effects so that the user does not feel irritation.

In the uses of incoming call melody sound and hold sound, modification is effected on tempo data to increase the tempo faster. This brings improvements in clearness and audition so that the user will not feel irritation. Because the incoming call melody sound is produced for notification of an incoming call and is not heard by the user in a leisurely fashion, it is recommended to increase the progression speed of a musical tune. In the uses of the BGM, music for appreciation, and karaoke accompaniment sound, it is preferable not to change tempo data so that music data will be accurately reproduced with fidelity to an original musical tune.

As incoming call melody sound that is produced for notification of an incoming call and is not heard by the user in a leisurely fashion, it is preferable to reproduce a musical tune from the climax section rather than the introduction section. That is, it is necessary to modify playback start position data in consideration of the aforementioned matter. When the system CPU 10 discriminates the first use for production of incoming call melody sound, it automatically modifies playback start position data to designate the climax section of a musical tune to be reproduced. In the other uses, the system CPU 10 does not modify playback start position data designating the introduction section of a musical tune, which is to be accurately reproduced with fidelity.

In the uses for production of incoming call melody sound and hold sound, modification is effected on pitch shift data to shift up pitches so that musical tones are improved in clearness and audition and are heard by the user without irritation. If the system CPU 10 discriminates the third use for production of BGM or fourth use for music appreciation, it is preferable not to modify pitch shift data so that music data are reproduced with fidelity to an original musical tune. When the system CPU 10 discriminates the fifth use for production of karaoke accompaniment sound, the present embodiment allows the user to arbitrarily modify pitch shift data.

Figure 8:
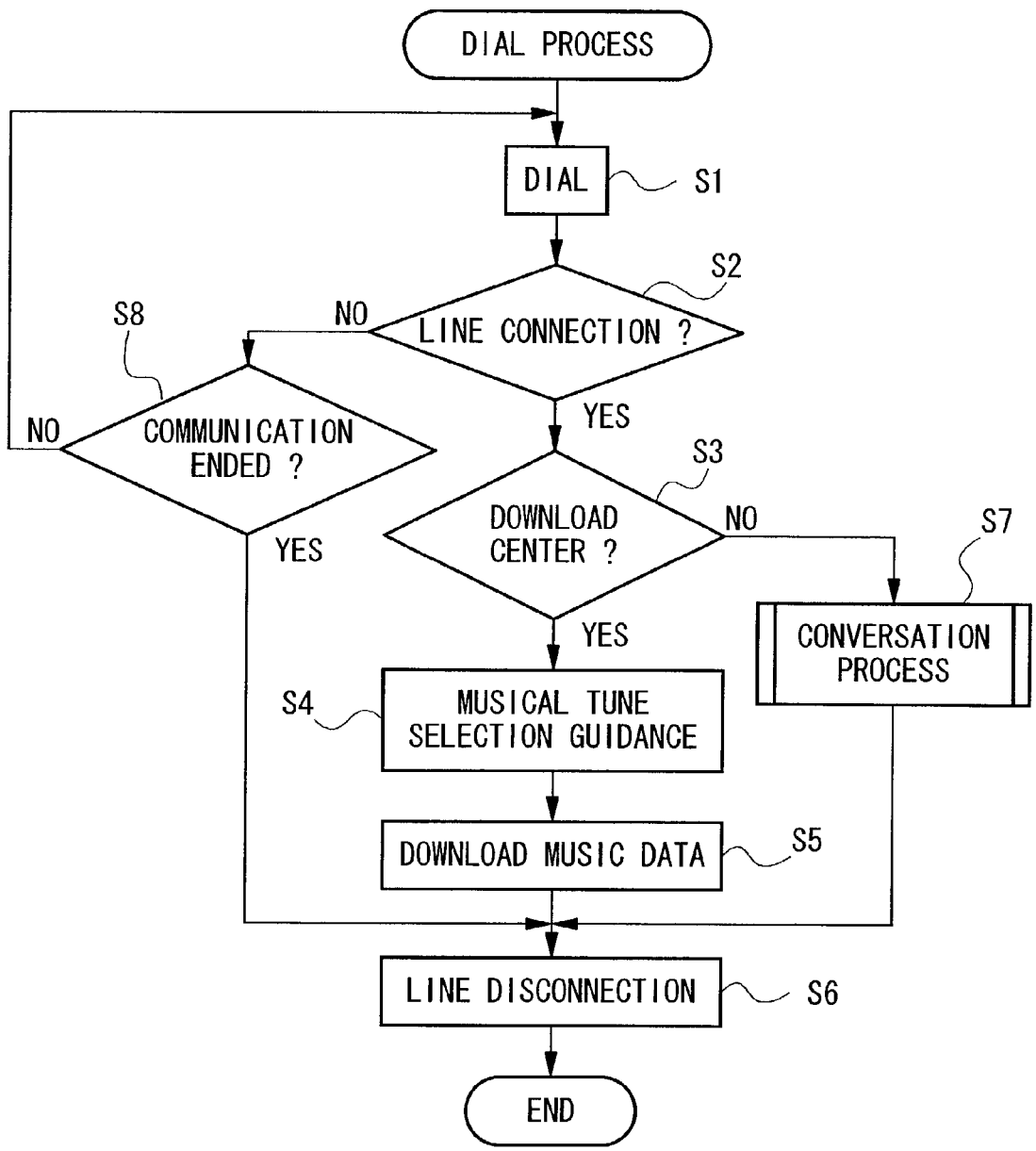
FIG. 8 is a flowchart showing a dial process that is executed by a system CPU of the portable telephone shown in FIGS. 2 and 3.

Next, a description will be given with respect to a dial process shown in FIG. 8. The dial process is executed by the system CPU 10 of the portable telephone 1 to establish a call connection with the download center 6.

First, the flow proceeds to step S1 in which the user operates dial buttons on the operator input section 17 of the portable telephone 1 to input the telephone number of a call destination, which is displayed on the screen of the display 18. After entry of the telephone number, the user presses a call transmission button (not shown) on the operator input section 17 of the portable telephone 1. Thus, the telephone number of the call destination is temporarily stored in the system RAM 11 and is added with telephone number information of the portable telephone 1 by itself to produce transmission signals, which are transmitted to a telephone terminal of the call destination by means of the communicator 13 and antenna 1*a*. Transmission signals are received by the base station C covering the prescribed zone to which the portable telephone 1 belongs. Transmission signals are relayed from the base station C to the mobile exchange 3. With reference to the telephone number of the call destination included in transmission signals, the mobile exchange 3 determines general telephone exchanges and base stations that construct parts of a communication path towards the call destination. Thus, the mobile exchange 3 transmits transmission signals onto the communication path to the call destination, which is a telephone terminal of the called party. Then, the telephone terminal rings incoming call sound. In step S2, a decision is made as to whether or not the telephone terminal is hooked off, in other words, whether or not a call reception button of the telephone terminal is operated. That is, a decision is made as to whether or not the telephone terminal makes a line connection with the portable telephone 1. If the telephone terminal is not hooked off, the flow proceeds to step S8 in which a decision is made as to whether or not the user presses a communication end button (not shown) on the operator input section 17. If the user does not press the communication end button, the flow returns to step S2 to make a decision again as to whether or not a line connection is established. Therefore, unless the user presses the communication end button, the system CPU 10 repeats the steps S2 and S8 until the telephone terminal established a line connection with the portable telephone 1.

When a call reception button of the telephone terminal is operated to establish a line connection with the portable telephone 1, the decision result of step S2 is "YES", so that the flow proceeds to step S3 in which a decision is made as to whether or not the call destination matches the download center 6. When the system CPU 10 determines in step S3 that the call destination matches the download center 6, the flow proceeds to step S4 in which musical tune selection guidance given from the download center 6 is displayed on the screen of the display 18. The musical tune selection guidance provides the user with three types of lists, namely, a singer-discriminating list, a genre-discriminating list, and a use-discriminating list. In accordance with these lists, the user is able to select musical tunes in consideration of singers, genre, and uses. In step S5, the user requests the download center 6 to download music data of selected musical tunes to the portable telephone 1. The downloaded music data are stored in the system RAM 11. Herein, the music data of each musical tune have the aforementioned configuration shown in FIG. 4.

After completion of downloading, the flow proceeds to step S6 in which the system CPU 10 disconnects the line with the telephone terminal of the call destination, so that the dial process is ended. When the system CPU 10 determines in step S3 that the call destination does not match the download center 6, the flow proceeds to step S7 in which the system CPU 10 performs a conversation process, details of which will be described later. After completion of a conversation process in step S7, the flow proceeds to step S6 in which the system CPU 10 disconnects the line with the telephone terminal of the call destination, so that the dial process is ended. In addition, when the system CPU 10 determines in step 8 that the user presses the communication end button, it disconnects the line with the telephone terminal of the call destination, so that the dial process is ended.

Figure 9:
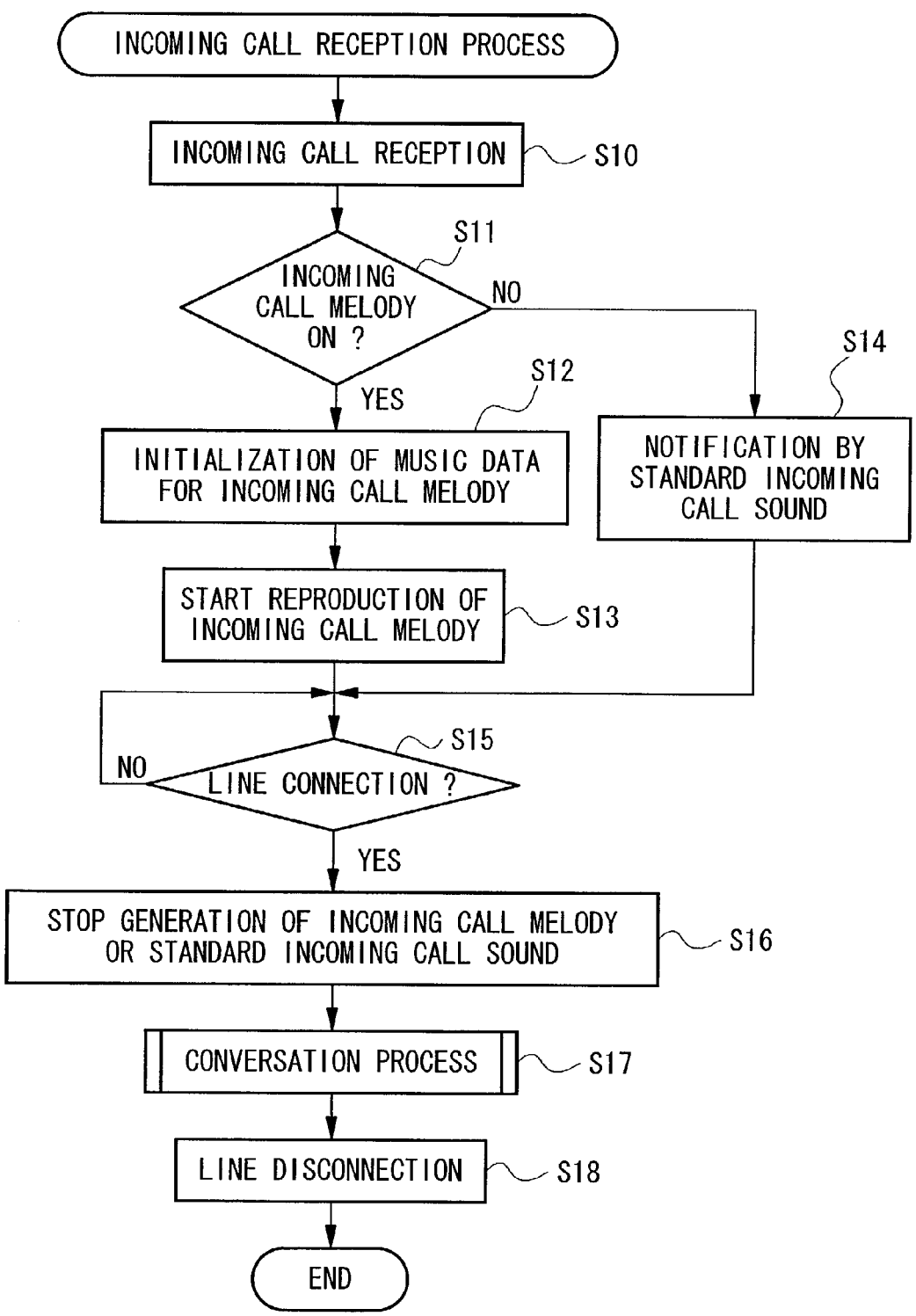
FIG. 9 is a flowchart showing an incoming call reception process that is executed by the system CPU of the portable telephone in accordance with a first embodiment of the invention.

Next, a description will be given with respect to an incoming call reception process that is executed by the system CPU 10 of the portable telephone 1 in accordance with the first embodiment of the present invention. Details of the incoming call reception process are shown in FIG. 9.

The system CPU 10 initiates an incoming call reception process in response to reception of an incoming call from a telephone terminal of a calling party. Firstly, the flow proceeds to step S10 in which the system CPU 10 detects an incoming call from the calling party, so that telephone number information notified from the telephone terminal is stored in the system RAM 11. In step S11, a decision is made as to whether or not the user turns on incoming call melody and instructs the portable telephone 1 to produce musical tones in the music playback section 15 as incoming call melody sound. When the user turns on incoming call melody, the flow proceeds to step S12 in which initialization is performed on music data for use in production of incoming call melody sound. In the initialization, prescribed music data that are listed in advance for use in production of incoming call melody sound are read from the system RAM 11 or system ROM 12 and are transferred to the music playback section 15.

Concretely speaking, the system CPU 10 proceeds to transfer of music data for use in production of incoming call melody sound, namely, tone color data, tone color assignment data, tempo data, and pitch shift data. In addition, the system CPU 10 also proceeds to transfer of musical score data of thirty-two words starting from the playback start position of a musical tune that is designated by playback start position data within music data. The aforementioned data are transferred to the music playback section 15.

Herein, tone color data are stored in the Voice RAM 34, while the sequencer 33 translates tone color assignment data and accesses the Voice RAM 34 to read tone color parameters for respective parts of a musical tune, which are set to the sound source 35. In addition, tempo data and pitch shift data are set to the sequencer 33. Further, musical score data of thirty-two words are sequentially written to the FIFO memory 31 in conformity with the transfer order.

After completion of initialization in step S12, when the sequencer 33 receives a start signal, the flow proceeds to step S13 in which the system CPU 10 starts reproduction of incoming call melody sound. That is, the sound source 35 reproduces musical tone signals of respective parts of a musical tune on the basis of tone-generation parameters given from the sequencer 33, so that the speaker 23 produces the corresponding musical tones. When the system CPU 10 determines in step S11 that the user does not turn on incoming call melody, the flow proceeds to step S14 in which the sound source 35 proceeds to reproduction of standard incoming call sound corresponding to the conventional beep sound, so that the speaker 23 produces standard incoming call sound in response to reception of an incoming call. Incidentally, the user is able to set up the portable telephone 1 to activate the vibrator 19 generating vibration, which is substituted for standard incoming call sound. After completion of step S13 or S14 regarding production of incoming call sound, the flow proceeds to step S15 in which a decision is made as to whether or not a line connection is established. This decision step S15 is repeatedly performed until the user presses the incoming call reception button, so that the portable telephone 1 continuously rings incoming call sound. When a line connection is established, the flow proceeds to step S16 in which the system CPU 10 supplies a stop signal to the sequencer 33 to stop production of incoming call melody sound or standard incoming call sound.

In step S17, the system CPU 10 performs a conversation process, in which the user of the portable telephone 1 is able to make conversation with a person of a telephone terminal. Details of the conversation process will be described later. After completion of the conversation process of step S17, the flow proceeds to step S18 in which the portable telephone 1 disconnects the line connection to end the incoming call reception process.

Next, a description will be given with respect to an incoming call reception process that is executed by the system CPU 10 of the portable telephone 1 in accordance with the second embodiment of the present invention. Basically, the incoming call reception process of the second embodiment is similar to the foregoing incoming call reception process of the first embodiment. Hence, the second embodiment performs the incoming call reception process in accordance with the flowchart of FIG. 9. Herein, only a minor difference is provided in step S12 between the first and second embodiments. Therefore, the incoming call reception process of the second embodiment will be described with reference to the step S12.

In the second embodiment that is described above, common music data are shared among different uses, whereas in initialization, a reproduction manner modification program is performed on music data to suit the specific use, so that modified music data are transferred to the music playback section 15.

That is, in step S12, the system CPU 10 performs a reproduction manner modification program on music data that are read from the system RAM 11 or system ROM 12, so that modified music data are transferred to the music playback section 15. Concretely speaking, tone color data within music data are modified to suit incoming call melody sound, so that modified tone color data are transferred to the sequencer 33. Tone color assignment data are common-use data, hence, they are directly transferred to the sequencer 33 without modification. Tempo data are modified to suit incoming call melody sound, so that modified tempo data are transferred to the sequencer 33. Similarly, pitch shift data are modified to suit incoming call melody sound, so that modified pitch shift data are transferred to the sequencer 33. Further, playback start position data are modified to suit incoming call melody sound, so that modified playback start position data are used to designate the playback start position of a musical tune. Thus, musical score data of thirty-two words after the playback start position are transferred to the FIFO memory 31. The transferred data are respectively and adequately stored in the music playback section 15 as similar to the foregoing first embodiment, hence, detailed description thereof will be omitted.

Figure 10:
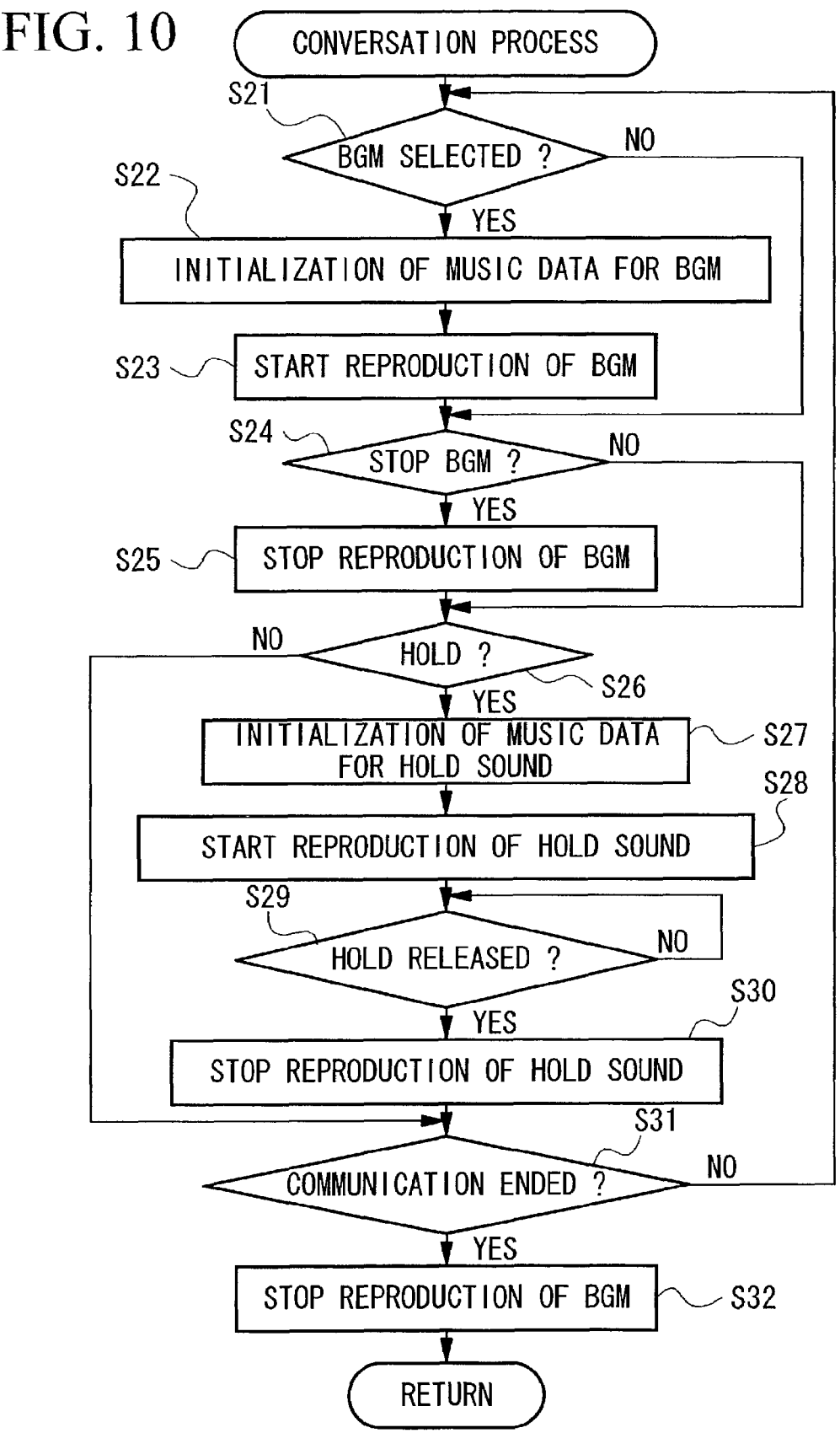
FIG. 10 is a flowchart showing a conversation process that is executed by the system CPU during the execution of a dial process or incoming call reception process.

Next, a description will be given with respect to the conversation process, which is executed in step S7 of the dial process shown in FIG. 8 and in step S17 of the incoming call reception process shown in FIG. 9, with reference to FIG. 10. Herein, the conversation process is executed by the system CPU 10 of the portable telephone 1 of the first embodiment. Basically, the conversation process is divided into two processes, namely, a BGM playback process and a hold sound process.

When a conversation process is started, the flow firstly proceeds to step S21 in which a decision is made as to whether or not the user operates the dial buttons or jog dial on the operator input section 17 to make BGM setup for allowing the portable telephone 1 to reproduce BGM as background sound during conversation in progress. When the user makes the BGM setup, the flow proceeds to step S22 in which initialization is performed on music data that the user selects for use in production of BGM by operating dial buttons or jog dial on the operator input section 17. That is, music data selected for use in production of BGM are read from the system RAM 11 or system ROM 12 and are transferred to the music playback section 15.

Concretely speaking, the system CPU 10 proceeds to transfer of music data for use in production of BGM, namely, tone color data, tone color assignment data, tempo data, and pitch shift data. In addition, the system CPU 10 also proceeds to transfer of musical score data of thirty-two words after the playback start position designated by playback start position data within music data. Tone color data are stored in the Voice RAM 34 of the music playback section 15. The sequencer 33 translates tone color assignment data and accesses the Voice RAM 34 to read tone color parameters for respective parts of a musical tune, which are set to the sound source 35. In addition, tempo data and pitch shift data are set to the sequencer 33. Further, the musical score data of thirty-two words are sequentially written to the FIFO memory 31 in conformity with the transfer order.

After completion of the initialization in step S22, when the sequencer 33 receives a start signal, the flow proceeds to step S23 in which the system CPU 10 starts reproduction of music data for use in production of the BGM. That is, the sound source 35 reproduces musical tone signals for respective parts of a musical tune on the basis of musical score data read from the FIFO memory 31 in connection with tone-generation parameters given from the sequencer 33 and tone color parameters given from the Voice RAM 34. Reproduced musical tone signals are mixed together with received speech signals, so that the speaker 22 reproduces received speech signals accompanied with BGM. In addition, reproduced musical tone signals are mixed together with transmitting speech signals, so that mixed signals are transmitted to the telephone terminal of a person who is presently communicating with the user of the portable telephone 1. As described above, it is possible to arbitrarily select or change the musical tune that is reproduced as BGM during conversation in progress.

In step S24, a decision is made as to whether or not the user makes a stop instruction to stop playback of BGM. That is, when the system CPU 10 detects that the user operates dial buttons or jog dial to stop playback of BGM, the flow proceeds to step S25 in which the sequencer 33 receives a stop signal to stop reproduction of music data for use in production of BGM. After completion of the step S25 or when the system CPU 10 determines in step S24 that the user does not operates the operator input section 17 to stop playback of BGM, the flow proceeds to step S26.

The BGM playback process contains foregoing steps S21 to S25, while the hold sound process contains step S26 to S30. When the user presses a hold button on the operator input section 17, the portable telephone 1 is set in a hold mode. In this case, the system CPU 10 detects in step S26 that the portable telephone 1 is set in a hold mode, so that the flow proceeds to step S27 in which initialization is performed on music data which are selected in advance for use in production of hold sound. In the initialization, music data selected for use in production of hold sound are read from the system RAM 11 or system ROM 12 and are transferred to the music playback section 15. Thus, the system CPU 10 completes the initialization on music data for use in production of hold sound.

Concretely speaking, the system CPU 10 proceeds to transfer of music data for use in production of hold sound, namely, tone color data, tone color assignment data, tempo data, and pitch shift data. In addition, the system CPU 10 also proceeds to transfer of musical score data of thirty-two words after the playback start position designated by playback start position data within music data. Tone color data are stored in the Voice RAM 34 of the music playback section 15. The sequencer 33 translates tone color assignment data and accesses the Voice RAM 34 to read tone color parameters for respective parts of a musical tune, which are set to the sound source 35. In addition, tempo data and pitch shift data are set to the sequencer 33. Further, musical score data of thirty-two words are sequentially written to the FIFO memory 31 in conformity with the transfer order.

After completion of the initialization in step S27, when the sequencer 33 receives a start signal, the flow proceeds to step S28 in which the system CPU 10 starts reproduction of music data for use in production of hold sound. That is, the sound source 35 reproduces musical tone signals for respective parts of a musical tune on the basis of musical score data read from the FIFO memory 31 and tone-generation parameters given from the sequencer 33. Thus, the speaker 22 produces hold sound based on reproduced musical tone signals. In addition, reproduced musical tone signals are forwarded to the speech processor 14, from which they are transmitted to the telephone terminal of a person who is presently communicating with the user of the portable telephone 1.

After starting reproduction of hold sound in step S28, the flow proceeds to step S29 in which a decision is made as to whether or not the user operates a button to release a hold mode. The portable telephone 1 is placed in a standby state until the hold mode is released. When the system CPU 10 detects in step S29 that the user operates a button to release the hold mode, the flow proceeds to step S30 in which the sequencer 33 receives a stop signal to stop reproduction of music data for use in production of hold sound. After completion of the step S30 or when the system CPU 10 determines in step S26 that the user does not operate the hold button, the flow proceeds to step 31 in which a decision is made as to whether or not the user presses a communication end button. When the user presses a communication end button, the flow proceeds to step S32 in which while the system CPU 10 performs playback of BGM in progress, the sequencer 33 receives a stop signal to stop reproduction of music data for use in production of BGM. After completion of the step S32, the system CPU 10 ends a conversation process to revert control back to the original process, wherein the flow proceeds to step S6 representing a dial process shown in FIG. 8 or step S18 representing an incoming call reception process shown in FIG. 9. That is, the system CPU 10 disconnects a line connection established between the user's portable telephone 1 and the telephone terminal. When the system CPU 10 determines in step S31 that the user does not press a communication end button, the flow returns to step S21 again, so that a series of steps S21 to S31 are repeated until the user presses the communication end button.

Next, a description will be given with respect to a conversation process that is executed by the system CPU 10 of the portable telephone 1 of the second embodiment. The second embodiment is basically similar to the first embodiment, so that the conversation process will be described with reference to FIG. 10. Compared with the conversation process implemented by the first embodiment, the conversation process implemented by the second embodiment is characterized in contents of steps S22 and S27 regarding initialization on music data for use in production of BGM and hold sound. Hence, the conversation process of the second embodiment will be described with regard to these steps S22 and S27.

The second embodiment is designed in such a way that music data are commonly shared among different uses, wherein music data are modified to suit the specific use by running a reproduction manner modification program, so that modified music data are transferred to the music playback section 15.

After completion of step S21 whose content is described above in conjunction with the first embodiment, the system CPU 10 of the portable telephone 1 of the second embodiment proceeds to step S22 to run a reproduction manner modification program. Thus, music data that are read from the system RAM 11 or system ROM 12 are modified to suit the specific use, so that modified music data are transferred to the music playback section 15. Concretely speaking, tone color data within music data are modified for use in production of BGM, so that modified tone color data are transferred to the music playback section 15. Tone color assignment data that are common data are directly transferred to the music playback section 15 without modification. Tempo data are modified for use in production of BGM, so that modified tempo data are transferred to the music playback section 15. Similarly, pitch shift data are modified for use in production of BGM, so that modified pitch shift data are transferred to the music playback section 15. Further, playback start position data are modified for use in production of BGM, so that modified playback start position data are used to designate a playback start position. Hence, musical score data of thirty-two words after the playback start position are transferred to the music playback section 15. Transferred data are respectively and adequately stored in the music playback section 15 similarly to the foregoing first embodiment, hence, the description thereof will be omitted.

In step S27, the system CPU 10 of the portable telephone 1 of the second embodiment runs a reproduction manner modification program to modify music data for use in production of hold sound. Concretely speaking, tone color data within music data are modified for use in production of hold sound, so that modified tone color data are transferred to the music playback section 15. Tone color assignment data that are common data are directly transferred to the music playback section 15 without modification. Tempo data are modified for use in production of hold sound, so that modified tempo data are transferred to the music playback section 15. Similarly, pitch shift data are modified for use in production of hold sound, so that modified pitch shift data are transferred to the music playback section 15. Further, playback start position data are modified for use in production of hold sound, so that modified playback start position data are used to designate the playback start position. Hence, musical score data of thirty-two words after the playback start position are transferred to the music playback section 15. Transferred data are respectively and adequately stored in the music playback section 15 similarly to the first embodiment, hence, the description thereof will be omitted.

Next, a description will be given with respect to a musical tune setting process executed by the system CPU 10 of the portable telephone 1 of the first embodiment with reference to FIG. 11.

When the user operates dial buttons or jog dial on the operator input section 17 to set a musical tune setting mode, the system CPU 10 initiates a musical tune setting process and proceeds to step S41 to allow the user setting an incoming call melody mode as to whether or not musical tones reproduced by the music playback section 15 are produced as incoming call melody sound. When the user turns on an incoming call melody mode, the system CPU 10 makes determination in step S11 of the incoming call reception process (see FIG. 9) as to "incoming call melody ON". After completion of the step S41, the user is able to set a musical tune number designating a musical tune for use in production of incoming call melody sound. Musical tune numbers are stored in the system RAM 11 or system ROM 12 in connection with music data representative of prescribed musical tunes which are listed in advance for use in production of incoming call melody sounds. The user is able to arbitrarily select a musical tune number designating a desired musical tune within prescribed musical tunes. Herein, flag information is attached to each of prescribed musical tunes that are provided for use in production of incoming call melody sounds. Thus, it is possible to select from among all musical tunes prescribed musical tunes, which are selectively displayed on the screen of the display 18 together with titles. This allows the user to easily select a desired musical tune for use in production of incoming call melody sound. In step S12 of the incoming call reception process shown in FIG. 9, initialization is effected on music data designated by the musical tune number that is set by the user in the musical tune setting process.

In step S43, the user is able to arbitrarily set a musical tune number designating a musical tune for use in production of hold sound. That is, the user is able to arbitrarily set a musical tune number designating a desired musical tune, which is selected from among prescribed musical tunes whose music data are stored in the system RAM 11 or system ROM 12 for use in production of hold sounds. Flag information is attached to each of prescribed musical tunes, which are selectively displayed on the screen of the display 18 together with titles. In step S27 of the conversation process shown in FIG. 10, initialization is effected on music data representative of a musical tune that is designated by the musical tune number set by the user in the musical tune setting process. In step S44, the user is able to assign musical tune numbers to dial buttons and jog dial on the operator input section 17 of the portable telephone 1. FIG. 12 shows an example of dial buttons 17a consisting of twelve buttons, namely, numeric buttons '0' to '9', and code buttons '*' and '#'. Therefore, it is possible for the user to arbitrarily assign musical tune numbers to these buttons. The user is able to designate each of assigned musical tune numbers by operating its corresponding dial button or code button in step S21 of the conversation process. That is, the system CPU 10 reads music data designated by the musical tune number assigned to a dial button or code button that is operated by the user, so that music data are set for use in production of BGM.

In step S45, the system CPU 10 performs a use-specified music data modification process, which is effected on "common" music data that are not specified in use and are stored in the system RAM 11 or system ROM 12. Due to the execution of a use-specified music data modification process, music data are modified to suit the specific use. Concretely speaking, modification is effected on tone color data, tempo data, pitch shift data, and playback start position data within music data. Flag information is attached to music data that are modified to suit the specific use. Thus, use-specified music data accompanied with flag information are created and are stored in the system RAM 11. The user is able to arbitrarily select music data that are subjected to a use-specified music data modification process. Suppose that the download center 6 does not accumulate music data corresponding to a specific use that the user requests. In that case, the user retrieves the same title selected from all titles listed in the download center 6, so that the user at once downloads the other music data of the same title whose use differs from the requested specific use or which is not specified in use. Then, a use-specified music data modification process is effected on downloaded music data to suit the specific use that the user requests. Thus, use-specified music data are created and are stored in the system RAM 11. This guarantees same effects in that the user downloads desired use-specified music data to the system RAM 11.

Next, a description will be given with respect to a musical tune setting process executed by the system CPU 10 of the portable telephone 1 of the second embodiment. The second embodiment is basically similar to the first embodiment, so that a musical tune setting process of the second embodiment can be described with reference to FIG. 11. Compared with the first embodiment, the second embodiment does not require a use-specified music data modification process, hence, step S45 is excluded from the flowchart of FIG. 11. In addition, the second embodiment differs from the first embodiment in contents of steps S42 and S43 regarding setting of musical tune numbers for incoming call melody sound and hold sound. Hence, the description will be made with regard to the step S42 and S43 only.

The step S42 allows the user to set a musical tune number designating a musical tune for use in production of incoming call melody sound. The user is able to arbitrarily select a musical tune number from among musical tune numbers designating prescribed musical tunes, which are listed in advance for use in production of incoming call melody sound and which are selectively displayed on the screen of the display 18 together with titles. That is, the user is able to select a desired musical tune whose music data are stored in the system RAM 11 or system ROM 12 on the screen of the display 18. In step S12 of the incoming call reception process, initialization is effected on music data representative of a desired musical tune designated by the musical tune number, which is set by the user in step S42 of the musical tune setting process. In the initialization, the system CPU 10 modifies music data to suit the specific use by running a reproduction manner modification program, so that use-specified music data are created and are transferred to the music playback section 15.

The step S43 allows the user to arbitrarily set a musical tune number designating a musical tune for use in production of hold sound. Herein, the user is able to arbitrarily select a musical tune number from among musical tune numbers designating prescribed musical tunes, which are listed in advance for use in production of hold sound and which are selectively displayed on the screen of the display 18 together with titles. That is, the user is able to select a desired musical tune whose music data are stored in the system RAM 11 or system ROM 12 on the screen of the display 18. In step S27 of the conversation process, initialization is effected on music data representative of a musical tune that is designated by the musical tune number set by the user in step S43 of the musical tune setting process. In the initialization, the system CPU 10 modifies music data to suit the specific use by running a reproduction manner modification program, so that use-specified music data are created and are transferred to the music playback section 15.

As described above, the second embodiment does not need the use-specified music data modification process, so that step S45 is excluded from the flowchart of FIG. 11. Because, data processing similar to the use-specified music data modification process is executed in the initialization, namely, step S 12 of the incoming call reception process as well as steps S22 and S27 of the conversation process. In the initialization, a reproduction manner modification process is effected on music data to suit the specific use. For this reason, the second embodiment does not raise problem due to exclusion of step S45 in the flowchart of FIG. 11.

Figure 13:
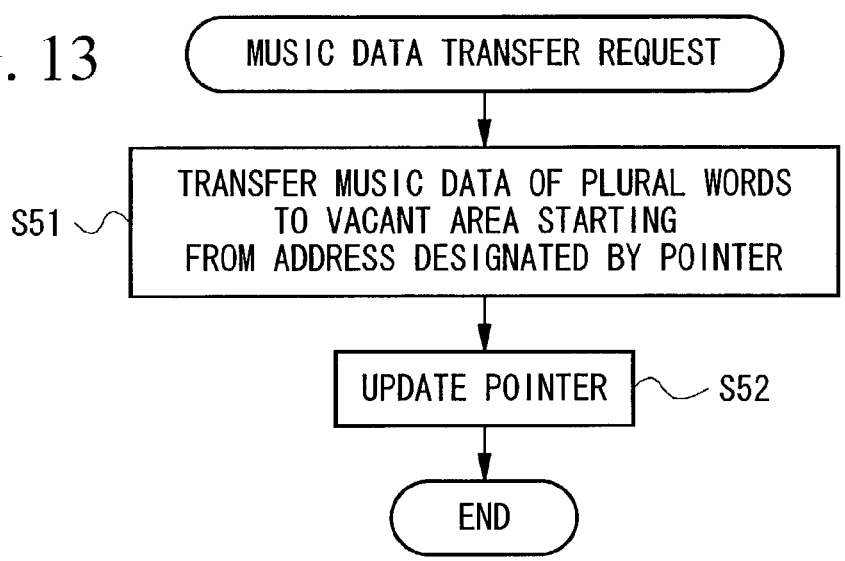
FIG. 13 is a flowchart showing a music data transfer request process that is initiated by the system CPU in response to an interrupt request signal requesting transfer of musical score data in conformity with a vacant area.

With reference to FIG. 13, a description will be given with respect to a music data transfer request process that is executed by the system CPU 10 in response to an interrupt request signal (IRQ), which is issued when a vacant area of the prescribed size emerges in the FIFO memory 31 during reproduction of music data in progress. The music data transfer request process is similarly performed in both the first and second embodiments.

When the size of a vacant area that emerges in the FIFO memory 31 reaches the prescribed number of words, the FIFO memory 31 issues an interrupt request signal (IRQ) to the system CPU 10. Upon receipt of an IRQ, the system CPU 10 accesses the system RAM 11 or system ROM 12 to read the next portion of musical score data, which meets the vacant area consisting of the prescribed number of words and which are transferred to the music playback section 15 in step S51. That is, the next portion of musical score data is transferred to the music playback section 15, wherein musical score data are output from the output terminal DATA of the interface 30 and are sequentially written to the vacant area of the FIFO memory 31 in response to write pulses (WP) given from the INDEX decoder 32. The start point of the vacant area is designated by a pointer. Due to transfer of the musical score data to the vacant area, the pointer is updated to designate an address that is advanced by the number of words of the transferred musical score data. Then, the system CPU 10 ends the music data transfer request process. Thereafter, when the FIFO memory 31 issues an interrupt request signal (IRQ), the transfer process is repeatedly performed on musical score data with reference to the updated pointer.

Figure 14:
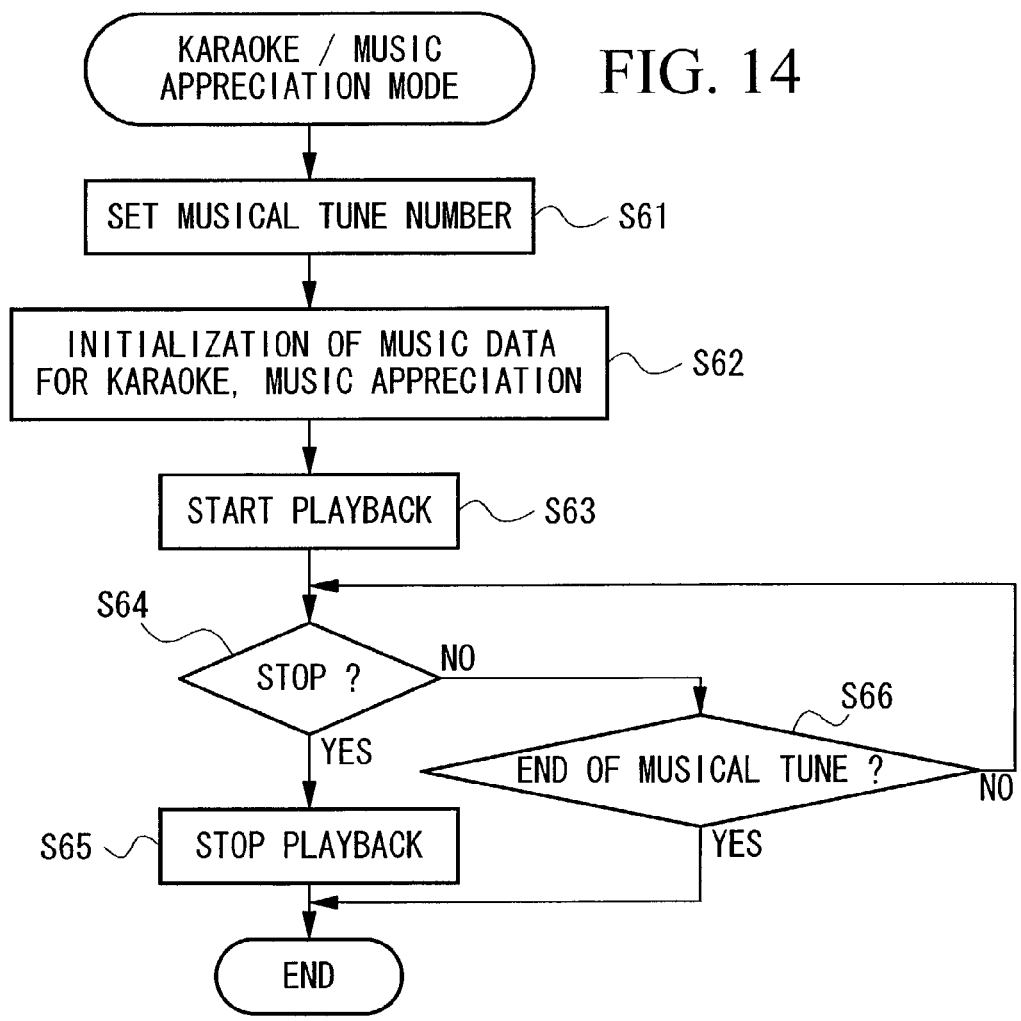
FIG. 14 is a flowchart showing a karaoke mode process for production of karaoke accompaniment sound and a music appreciation mode process for playback of music for appreciation.

Next, a karaoke mode process and a music appreciation mode process will be described with reference to FIG. 14. These processes are both executed by the system CPU 10 of the portable telephone 1 of the first embodiment, wherein the karaoke mode process is performed to reproduce karaoke accompaniment sound while the music appreciation mode process is performed to play back music for appreciation.

The user is able to set a karaoke mode or music appreciation mode by operating dial buttons or jog dial on the operator input section 17 of the portable telephone 1. The karaoke mode allows the user to set a musical tune number designating a desired musical tune for use in playback of karaoke accompaniment sound, and the music appreciation mode allows the user to set a musical tune number designating a desired musical tune that is played back as music for appreciation. That is, the user sets the musical tune number of a desired musical tune in step S61. Herein, the user is able to arbitrarily select a musical tune from among prescribed musical tunes whose music data are stored in advance in the system RAM 11 or system ROM 12 for use in playback of karaoke accompaniment sound and music for appreciation. Flag information is attached to each of prescribed musical tunes, musical tune numbers of which are selectively displayed on the screen of the display 18 together with titles in response to the karaoke mode and music appreciation mode respectively.

In step S62, initialization is performed on music data, which are selected by the user for use in playback of karaoke accompaniment sound or music for appreciation. In the initialization, the selected music data are read from the system RAM 11 or system ROM 12 and are transferred to the music playback section 15.

Concretely speaking, the system CPU 10 proceeds to transfer of music data, namely, tone color data, tone color assignment data, tempo data, and pitch shift data. Among them, tone color data, tempo data, and pitch shift data are each provided to cope with different uses, namely, playback of karaoke accompaniment sound and playback of music for appreciation, while tone color data are commonly shared between different uses. In addition, music data also provide playback start position data to suit each of different uses, so that playback start position data are used to designate the playback start position for use in playback of karaoke accompaniment sound or the playback start position for use in playback of music for appreciation. Thus, the system CPU 10 reads musical score data of thirty-two words after the playback start position that is designated by playback start position data to suit each of different uses, so that musical score data are transferred to the music playback section 15.

In the music playback section 15, the tone color data are stored in the Voice RAM 34. The sequencer 33 translates tone color assignment data and accesses the Voice RAM 34 to read tone color parameters for respective parts of a musical tune, which are set to the sound source 35. In addition, tempo data and pitch shift data are set to the sequencer 33. Further, musical score data of thirty-two words are sequentially written to the FIFO memory 31 in conformity with the transfer order.

After completion of the initialization in step S62, when the sequencer 33 receives a start signal, the flow proceeds to step S63 in which the system CPU 10 starts reproduction of music data, which are provided in response to a karaoke mode or music appreciation mode. Thus, the sound source 35 reproduces musical tone signals for respective parts of a musical tune based on musical score data read from the FIFO memory 31 in accordance with tone-generation parameters given from the sequencer 33 and tone color parameters given from the Voice RAM 34. That is, it is possible to reproduce musical tone signals for use in playback of karaoke accompaniment sound or music for appreciation. Reproduced musical tone signals are supplied to the speaker 23 via the amplifier 39, mixer 40, and amplifier 41, so that the speaker 23 produces karaoke accompaniment sound or music for appreciation. In the karaoke mode, user's vocal sound is picked up by the microphone 21 and is converted to vocal sound signals, which are mixed together with musical tone signals representing karaoke accompaniment sound by the mixer 40. Mixed signals are supplied to the speaker 23 via the amplifier 41, so that the speaker 23 reproduces the user's vocal sound accompanied with karaoke accompaniment sound.

In step S64, a decision is made as to whether or not the user operates the portable telephone 1 to stop karaoke accompaniment sound or music for appreciation. When the user operates dial buttons or jog dial to stop playback of karaoke accompaniment sound in the karaoke mode or stop playback of music in the music appreciation mode, the flow proceeds to step S65 in which the sequencer 33 of the music playback section 15 receives a stop signal so that the karaoke mode process or music appreciation mode process is stopped. When the system CPU 10 determines in step S64 that the user does not operate the portable telephone 1 to stop playback of karaoke accompaniment sound or music for appreciation, the portable telephone 1 continues playback of music data up to its end position. In this case, the flow proceeds to step S66 in which a decision is made as to whether or not the playback is completed up to the end position of music data. If the playback is not completed up to the end position of music data, the flow returns to step S64, so that the steps S64 and S66 are repeated until the user operates the portable telephone 1 to stop playback or until playback is completed up to the end position of music data. When playback is completed up to the end position of music data, the decision result of step S66 becomes "YES", so that the system CPU 10 ends the karaoke mode process or music appreciation mode process.

Next, a description will be given with respect to a karaoke mode process and a music appreciation mode process that are executed by the system CPU 10 of the portable telephone 1 of the second embodiment. The second embodiment is basically similar to the first embodiment, so that the aforementioned processes will be described with reference to FIG. 14. Unlike the first embodiment, the second embodiment is characterized by the contents of steps S61 and S62, so that the description will be made with respect to these steps.

The step S61 allows the user to set a musical tune number designating a desired musical tune selected from among prescribed musical tunes whose music data are stored in the system RAM 11 or system ROM 12 for use in playback of karaoke accompaniment sound or music for appreciation. That is, the user is able to arbitrarily select a musical tune from among prescribed musical tunes whose musical tune numbers are displayed on the screen of the display 18 together with titles.

In step S62, initialization is performed on music data that the user selects for use in playback of karaoke accompaniment sound or music for appreciation by operating dial buttons or jog dial. In the initialization, the system CPU 10 executes a reproduction manner modification program to effect modification on selected music data that are read from the system RAM 11 or system ROM 12, so that modified music data are transferred to the music playback section 15. Concretely speaking, tone color data within selected music data are modified for use in playback of karaoke accompaniment sound or music for appreciation, so that modified tone color data are transferred to the music playback section 15. Tone color assignment data that are common data are directly transferred to the music playback section 15 without modification. Tempo data are modified for use in playback of karaoke accompaniment sound or music for appreciation, so that modified tempo data are transferred to the music playback section 15. Similarly, pitch shift data are modified for use in playback of karaoke accompaniment sound or the music for appreciation, so that modified pitch shift data are transferred to the music playback section 15. Further, playback start position data are modified for use in playback of karaoke accompaniment sound or music for appreciation, so that modified playback start position data are used to designate the playback start position of a musical tune that is played back as karaoke accompaniment sound or music for appreciation. Thus, musical score data of thirty-two words after the playback start position are transferred to the music playback section 15. Transferred data are respectively and adequately stored in the music playback section 15 similarly to the foregoing first embodiment, hence, the description thereof will be omitted.

As described heretofore, the first and second embodiments describe configurations and operations of the portable telephone 1 as working examples of the telephone terminal device of the present invention, wherein the FIFO memory 31 is limited in storage capacity to store only thirty-two words of musical score data. The storage capacity for musical score data is not necessarily limited as described above, in other words, the portable telephone is merely required to have a storage capacity for storing at least a part of musical score data to realize the basic performance of the present invention. In addition, the first and second embodiments describe that the Voice RAM 34 has a limited storage capacity for storing tone color data of eight tone colors. The storage capacity for tone color data is not necessarily limited as described above, in other words, the portable telephone is merely required to have a storage capacity for storing the number of tone colors that is greater than the number of parts of a musical tune to be played back.

The embodiments actualize processes regarding telephone functions and playback functions of musical tunes installed in the portable telephone by executing prescribed programs. Because these processes are executed in a software manner, it is easy to accommodate changes between the first embodiment and second embodiment. That is, by merely changing programs of the first embodiment with programs of the second embodiment, the portable telephone can be easily changed in functions from the first embodiment to the second embodiment. Incidentally, programs are basically preset to the system ROM 12, however, it is possible to install programs in the system RAM 11 from the external device 20. By installing programs from the external device 20, it is possible to easily change programs with new ones or update programs in version-up situation on the portable telephone. As the external device 20, it is possible to employ a variety of drives such as CD-ROM drives, MO drives, hard-disk drives, and removable-disk drives, for example.

The music playback section 15 contains the sound source 35 that is constituted as the FM sound source based on the frequency modulation system. The FM sound source is capable of providing higher harmonics, which are caused by frequency modulation, for use in synthesis of musical tones. The FM sound source can be designed by a simple circuit configuration to generate waveforms having higher harmonics components containing non-harmonic sound. That is, the FM sound source is capable of generating wide ranges of musical tones from electronic sounds to synthesized sounds of acoustic instruments.

The FM sound source uses oscillators called operators that generate equivalents of sine waves. That is, the FM sound source can be easily constituted by connecting first and second operators in a cascade-connection manner. In addition, the FM sound source can be constituted such that the operator feeds back its own output to the input thereof The system of the sound source 35 is not necessarily limited to the aforementioned frequency modulation system. That is, it is possible to employ a waveform memory sound source (or PCM sound source) and physical model sound source, for example. In addition, the sound source can be constituted as the hardware type using a digital signal processor (DSP) or the software type that runs sound source programs.

The format of musical score data is not necessarily limited to the foregoing format that simply contains note data and rest data as shown in FIG. 5. That is, it is possible to employ the MIDI format (where 'MIDI' is an abbreviation for 'Musical Instrument Digital Interface') for adding time information or the SMF (namely, 'Standard MIDI File') format.

The present invention has a variety of technical features and effects, which will be described below.

(1) At least a part of music data is commonly shared among different uses, therefore, it is possible to reduce the total storage capacity for storing multiple music data used for different purposes. That is, even though the portable telephone provides a relatively small storage capacity for storing music data, it is possible to store multiple music data representing musical tunes used for different purposes. Within music data, at least musical score data are commonly shared among different uses, therefore, it is possible to reduce the total amount of music data for different uses.

(2) It is possible to use common music data for different purposes. In reproduction, prescribed parameters of music data are modified to cope with a specific use. In this case, it is unnecessary to store plural music data for different uses with respect to the same musical tune. Thus, it is possible to easily store music data of plural musical tunes by the limited storage capacity of the portable telephone.

(3) A typical use of music data is to produce incoming call melody sound for notification of an incoming call on the portable telephone. Herein, parameters of music data are modified such that the user can listen to incoming call melody sound in the noisy environment. That is, it is possible to improve incoming call melody in clearness and audition by adequately modifying tempo parameters, pitch parameters, tone volume parameters, tone color parameters, and effect parameters with regard to music data.

Lastly, this invention is not necessarily limited to the foregoing embodiments, hence, it is possible to provide a variety of modifications within the scope of the invention without departing from essential subject matters.

The invention claimed is:

1. A telephone terminal device having a music playback function for generating musical tone signals to notify a user of reception of an incoming call, comprising:
   a communicator;

a storage for storing a plurality of music data representing a plurality of musical tunes, including common data, which are commonly used in different uses, and reproduction start position data, which differs from each other between an incoming call and other uses;

a music reproduction device for reproducing the music data supplied thereto within the plurality of music data stored in the storage; and a music data supply device for selecting the music data including the common data and the reproduction start position data used for incoming call notification from among the plurality of music data stored in the storage so as to supply the selected music data to the music reproduction device, wherein when the reproduction is made with respect to the other uses besides the incoming call notification, the music data supply device selects the music data including all of the common data and the reproduction start position data not related to the incoming call notification from among the plurality of music data stored in the storage to supply the selected music data to the music reproduction device, and the music reproduction device reproduces musical tone signals for the incoming call notification by starting at a prescribed position of the music data while in the other uses, the reproduction is started from a top position of the music data.

2. A telephone terminal device according to claim 1, wherein the other uses include generating a hold sound, background music during conversation in progress, karaoke accompaniment sound, or music for appreciation.

3. A telephone terminal device according to claim 1 further including a display for displaying a list of prescribed musical tunes that are suited for a specific use, for a user's selection.

* * * * *